United States Patent [19]

Lyon et al.

[11] Patent Number: 4,545,011

[45] Date of Patent: Oct. 1, 1985

[54] ENHANCED COMMUNICATIONS NETWORK TESTING AND CONTROL SYSTEM

[75] Inventors: David L. Lyon, Cambridge; Robert E. Huettner, Acton; Jerry L. Holsinger, Boston; Don I. Falkenstein, Lexington; Imtiaz Piracha, Peabody; Dennis T. Ching, Cambridge, all of Mass.

[73] Assignee: Infinet Inc., Andover, Mass.

[21] Appl. No.: 215,135

[22] Filed: Dec. 10, 1980

Related U.S. Application Data

[62] Division of Ser. No. 7,629, Jan. 29, 1979, abandoned.

[51] Int. Cl.⁴ ............................................. G06F 15/16
[52] U.S. Cl. .................................................... 364/200
[58] Field of Search ............................... 364/200, 900; 340/825.06, 825.08

[56] References Cited

U.S. PATENT DOCUMENTS

| | | | |
|---|---|---|---|
| 3,408,629 | 10/1968 | Haselwood | 364/900 |
| 3,701,113 | 10/1972 | Chace et al. | 364/200 |
| 3,824,547 | 7/1974 | Green | 371/55 |
| 3,882,305 | 5/1975 | Johnstone | 364/551 |
| 3,993,981 | 11/1976 | Cassarino | 364/200 |
| 4,027,289 | 5/1977 | Toman | 364/900 |
| 4,090,248 | 5/1978 | Swanson et al. | 340/825.06 |
| 4,220,990 | 9/1980 | Alles | 364/200 |

Primary Examiner—Raulfe B. Zache
Assistant Examiner—David Y. Eng
Attorney, Agent, or Firm—Lahive & Cockfield

[57] ABSTRACT

A network control and test system for application to data communications networks. In a first mode of operation, the system learns the network configuration automatically and builds a table describing the network configuration. In a second mode of operation, the system automatically monitors the status of the network and each of its component units, periodically polling the network for changes of status and updating the information in the network configuration table to reflect such changes. In a third mode of operation, selective sites in the network may be tested under control of the system at previously selected and entered times of day, at which times previously chosen tests are performed without the need for operator intervention. In a fourth mode, an operator can manually command the system to perform certain tests and control functions. A central site in the network includes the primary components of the system and each remote site includes a remote test module which operates under the control of and in cooperation with the central site equipment. The central site equipment includes a three-tiered, partially distributed data processing system having a semi-autonomous data processing system at each tier. Each of the tiers has predetermined functions and responsibilities. Extremely flexible and powerful operation is provided by this architecture.

22 Claims, 24 Drawing Figures

I LEARN

II AUTO MONITOR

1. Start AM
2. Abort AM
3. Stop Printing AM Results
4. Mask Term Strm ⎫
5. Mask Strm Dsbl ⎪
6. Mask DTE Powr/Ext Alrm ⎪
7. Mask Lne Lvl ⎬ (Ts,Te)
8. Mask Ext Alrm ⎪ (Ts = Start time;
9. Mask DSR ⎪ Te = Ending Time)
10. Mask SQD ⎭
11. Clear Masks

III APM SCHEDULE

1. Add APM Long ⎫ (T/P)
2. Add APM Short ⎭
3. Delete APM Long ⎫ (T/P)
4. Delete APM Short ⎭
5. Abort APM (P)
6. Clear APM Schedules

*Fig. 8A*

IV MODIFY

1. Add Site ⎫
2. Delete Site ⎪
3. Enable Site ⎪
4. Disable Site ⎬ (P/L/D)
5. Reset Status ⎪
6. Set Hot Spare ⎪
7. Reset Hot Spare ⎭

V SELF TEST

1. Console Self Test
2. System Self Test

VI TIME/DAY

1. Set Time (T)
2. Set Date (DT)

VII PRINT

1. Print Network
2. Print Faults
3. Print APM Schedules
4. Print Disabled Sites
5. Print Hot Spare Sites
6. Assign AM Device
7. Assign APM Device
8. Assign Copy Device

} (DV)

VIII DISPLAY

1. Display Faults
2. Display APM Schedules
3. Display Disabled Sites
4. Display Hot Spares
5. Display Ports
6. Display Lines (P)
7. Display Drops (P/L)
8. Display Masks

IX SPECIAL FUNCTIONS

1. Modem Self Test with Errors
2. Modem Self Test
3. Wrap Loop Test
4. AC Loop Command — Line 0
5. TX Off Command
6. Invalid Signal Inbound — Line 0, Drop 0

} (P/L/D)

X MEASURE ANALOG

1. Measure RX Loop - Line 0
2. Measure RX Inbound - Line 0
3. Measure SQ - Line 0

} (P/L/D)

XI MEASURE ERROR RATES

1. TX, RX Steady State - Line 0
2. TX, RX Steady State with Error - Line 0
3. TX + RX S/S        Line # ≠ 0
4. TX + RX S/S with Error        Line # ≠ 0
5. Dynamic Error Rate - Line 0
6. TX S/S        Line # ≠ 0
7. TX S/S with Error        Line # ≠ 0

} (P/L/D/E)

XII STATUS

1. Status Snapshot (Term Strm, Dsbl, DTE Power, EXT Alarm, Line Level, Hot Spare, SQD, DSR, DCD)

XII STATUS (cont'd)

2. Carrier Response
    3. DTE Streaming
    4. Carrier Streaming
    5. DTE Disabled
    6. DTE Power
    7. Line Level
    8. External Alarm
    9. DCD ON
    10. DSR ON
    11. SQD ON    (P/L/D)

XIII MONITOR INTERFACE (Paint and Blink)

1. TXD
    2. RXD
    3. RTS
    4. CTS
    5. DSR
    6. DCD
    7. SQD
    8. BCT
    9. BCR
    10. Line Level    (P/L/D)

XIV REMEDIAL COMMANDS

1. Streaming Terminal Disable
    2. Transfer to private line
    3. Modem Select
    4. Return to DDD    (P/L/D)

XV MEASURE ON-LINE

1. Measure TX Level - Line 0, Drop 0
    2. Measure RX Level - Line 0, Drop 0    (P/L/D)

XVI AUDIO MONITOR

1. Activate TX AUD MON (P)
    2. Activate RX AUD MON (P)
    3. Terminate AUDIO MON
    4. Audio Alarm: SOFT
    5. Alarm: LOUD
    6. AlarmL OFF    (P/L/D)

XVII COPY DISPLAY

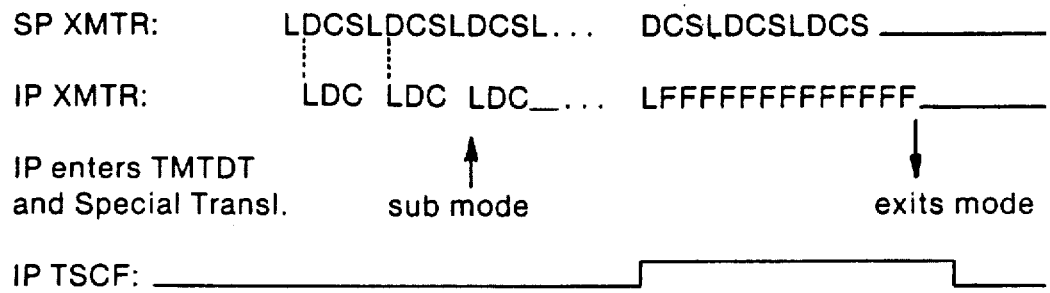

```
SP XMTR:        LDCSLDCSLDCSL...   DCSLDCSLDCS_____

IP XMTR:        LDC LDC LDC_....   LFFFFFFFFFFFFF_____

IP enters TMTDT        ↑                    ↓
and Special Transl.  sub mode           exits mode

IP TSCF: _____|‾‾‾‾‾‾‾‾‾‾‾|_____
```

*Fig. 14*

$D_x D_x D_x DDC[C]^1 C_0 C_1 C_2 C_3 C_4 C_5 C_6 C_7 [C_7]^2$

Where $D_x$ = Bogus drop character
      D = drop character
      C = Command;
          line continuity; evokes a mark response
     [ ] = optional; repeated until condition is satisfied
         1 = until TSCF on
         2 = until response complete
     $C_0$ = monitor DD; evokes space/mark pattern response
               used as start bit
  $C_1$-$C_7$ = 7 status commands

*Fig. 15*

$LL[L]^1 DDC[C]^2 C_0 C_1 C_2 C_3 C_4 C_5 C_6 C_7 [C_7]^3$

Where L = line character
     1 = until TSCF off
     2 = until TSCF on
     3 = until response complete

*Fig. 16A*

$LLD_xD_xD_xDDC[C]^2C_0C_1C_2C_3C_4C_5C_6C_7[C_7]^3$

Code Change Category

| EMS | NCS |
|---|---|
| Modem Select | Modem Select |
| Modem Test | Modem Test |
| Modem Test w/error | Modem Test w/error |
| Monitor BA-DD | Monitor BA-DD |
| Disable Terminal | Disable Terminal |
| Modem Transfer | Modem Transfer |
| DDD Return | DDD Return |
| Monitor Line Level | Line Level |
| STRM TERM/CAR | STRM SRCH |
| TERM DSBL | TERM DSBL |
| DSR ON | MON CC |
| DCD ON | MON CF |
| SQD ON | MON CG |
| LINE CONT | LINE CONT |
| LINE LEVEL | LINE LEVEL |
| DTE POWR | MON PT |
| EXT ALRM | TERM POWR |

Substitution Category

| EMS | NCS |
|---|---|
| SS BERT | TXRX QUAL |
| SS BERT w/errors | ISRT RXER |
| RX SIG Level Inbound | TXRX QUAL |
| SQ Level Inbound | TXRX QUAL |
| RX SIG Level Loop | Line Loop |
| Analog Loopback | Line Loop |
| TX OFF | Modem Test |
| XMIT QUAL | TXRX QUAL |
| TXRX QUAL | TXRX QUAL |
| Wrap Loop | Modem Select (first three commands) |
|  | Terminal Power (thereafter) |
| XMIT QUAL w/error | LINE LOOP (first three commands) |
|  | ISRT RXER (thereafter) |
| TXRX QUAL w/error | TXRX QUAL (first three commands) |
|  | ISRT RXER (thereafter) |

Special Translation Category a. Poll ERT (EMS command)
 — not phase two (code change): NCS command = Modem Test
 — phase two (free form):
  NCS sequence = $F_1, F_2, F_3, F_1, F_2, F_3$, etc.
   $F_1$ = Modem Test
   $F_2$ = TXRX QUAL
   $F_3$ = Pad
b. Status Snapshot (EMS command)
 — not phase two (code change):
  NCS command = Line Continuity
 — phase two (free form):
  NCS sequence = $F_0, F_1, F_2, F_3, F_4, F_5, F_6, F_7, F_7, F_7$, etc.
   $F_0$ = MON DD
   $F_1$ = TERM POWR
   $F_2$ = MON PT
   $F_3$ = STRM SRCH
   $F_4$ = TERM DSBL
   $F_5$ = LINE LEVL
   $F_6$ = MON CC
   $F_7$ = MON CG

Fig. 17

Key to Symbols

ZZ = line 0 drop 0
NZZ = not line 0 drop 0
LZ = line 0
NLZ = not line 0
H = makes sense with Hub/Remote address only. No action taken if addressed at IP except response is Outbound Error (7BH).
TDT = Two Drop Test
ADT = Any Drop Test

| 7-bit Hex Code (MSB on left) (parity bit is stripped in this table) | Command | Address | Translation Category | Response Format Category |
|---|---|---|---|---|
| 01 | Reset status vector (ADT) | | L | ACK |
| 02 | Modem Select (H) | | C | ACK |
| 10 | Audio Monitor (TX) | ZZ | L | ACK |
| 11 | Audio Monitor (RX) | ZZ | L | ACK |
| 12 | Audio Monitor (Clear) | ZZ | L | ACK |
| 18 | Analog (AC) Loop-back (H) | LZ | S-C | ACK |
| 1A | TX Off (modem) | | S-C | ACK |
| 20 | Modem Test | | C | Single Byte |
| 21 | Modem Test w/error | | C | Single Byte |
| 23 | Wrap Loop (H) | | S-S | Single Byte |
| 25 | Invalid Signal Inbound | ZZ | L | Single Byte |
| 28 | Monitor TXD (BA) | | C | Single Byte |
| 29 | Monitor RXD (BB) | | C | Single Byte |
| 2A | Monitor RTS (CA) | | C | Single Byte |

Fig. 18A

| 7-bit Hex Code (MSB on left) (parity bit is stripped in this table) | Command | Address | Translation Category | Response Format Category |
|---|---|---|---|---|
| 2B | Monitor CTS (CB) | | C | Single Byte |
| 2C | Monitor DSR (CC) | | C | Single Byte |
| 2D | Monitor DCD (CF) | | C | Single Byte |
| 2E | Monitor SQD (CG) | | C | Single Byte |
| 2F | Monitor BCT (DB) | | C | Single Byte |
| 30 | Monitor BCR (DD) | | C | Single Byte |
| 31 | Monitor Line Level | | C | Single Byte |
| 34 | STRM TERM/CAR | | C | Single Byte |
| 35 | TERM DSBL | | C | Single Byte |
| 36 | DSR ON | | C | Single Byte |
| 37 | DCD ON | | C | Single Byte |
| 38 | SQD ON | | C | Single Byte |
| 39 | Line Continuity | | C | Single Byte |
| 3A | Line Level | | C | Single Byte |
| 3C | DTE POWR | | C | Single Byte |
| 3D | EXT ALRM | | C | Single Byte |
| 48 | Polled (Dynamic) ERT (H, TDT) | LZ | ST | Single Byte |
| 50 | Steady State BERT (TX RX SS ERT) (H, TDT) | LZ | S-C | Double Byte |
| 51 | Steady State BERT w/errors, (H, TDT) | LZ | S-C | Double Byte |
| 52 | XMIT QUAL (TX SS ERT) | NLZ | S-C | Double Byte |
| 53 | XMIT QUAL w/error | NLZ | S-S | Double Byte |
| 54 | TXRX QUAL (TX + RX SS ERT) | NLZ | S-C | Double Byte |

*Fig. 18B*

| 7-bit Hex Code (MSB on left) (parity bit is stripped in this table) | Command | Address | Translation Category | Response Format Category |
|---|---|---|---|---|
| 55 | TXRX QUAL w/error | NLZ | S-S | Double Byte |
| 58 | RX Signal Level Loop (H, TDT) | LZ | S-C | Double Byte |
| 59 | RX Signal Level Inbound (H, TDT) | LZ | S-C | Double Byte |
| 5A | SQ Level Inbound (H, TDT) | LZ | S-C | Double Byte |
| 60 | TX Sig Level | ZZ | L | Double Byte |
| 61 | RX Sig Level | ZZ | L | Double Byte |
| 66 | Reset Hot Spare Status (ADT) | | L | ACK |
| 67 | Set Hot Spare Status (ADT) | | L | ACK |
| 70 | Request for Status (ADT) | | L | Triple Byte |
| 71 | Status Snapshot (TDT) | | ST | Triple Byte |
| 78 | Disable Terminal (H) | | C | ACK |
| 7A | Modem Transfer (H) | | C | ACK |
| 7B | DDD return (H) | | C | ACK |
| Others | All unused codes | | | ERROR |

*Fig. 18C*

ENHANCED COMMUNICATIONS NETWORK TESTING AND CONTROL SYSTEM

This is a division of application Ser. No. 007,629 filed Jan. 29, 1979 now abandoned.

CROSS REFERENCE TO RELATED APPLICATION AND PATENTS

U.S. patent application Ser. No. 947,058 filed Sept. 29, 1978, for MODEM TESTING SYSTEM, which application is a continuation of application Ser. No. 503,625, deposited Sept. 6, 1974 and having a filing date of Nov. 4, 1974 for DATA PROCESSING SYSTEM TESTING CIRCUITS, and now abandoned.

U.S. Pat. No. 4,076,961, issued Feb. 28, 1978 for an AUTOMATIC SWITCHING UNIT FOR DATA COMMUNICATIONS NETWORK.

U.S. Pat. No. 4,055,808, issued Oct. 25, 1977, for a DATA COMMUNICATIONS NETWORK TESTING SYSTEM.

FIELD OF THE INVENTION

This invention relates to digital data communications networks and, more specifically, to diagnostic testing and control systems for use in those networks.

BACKGROUND OF THE INVENTION

Typical data communications networks include a central site and one or more remote sites, or "drops." Each such remote site connects to the central site by means of telephone or other equivalent communications links. The equipment at each of the central and remote sites connects to a modulator-demodulator unit (i.e., a modem) which provides an interface between the communications link and the equipment which communicates with the network.

The aforementioned U.S. Application Ser. No. 503,625 discloses diagnostic circuitry that is used in such digital data communications networks. This circuitry connects to the modem at each site and allows an operator at a central site to address the diagnostic circuitry at any one of several remote sites, and then to test or control the corresponding modem. Such a modem is a "host" modem and the diagnostic circuitry is used to ascertain the operative status of the host modem, in many cases without interrupting normal communications over the communications link. This circuitry, however, is limited to a network in which there are no intervening modems between the central site and each designated remote site.

In some networks, however, the remote sites are widely separated geographically. Yet within such networks, several remote sites might be clustered geographically. A digital data communications network to which the system described in the aforementioned application Ser. No. 503,625 is applied, requires redundant telephone lines between the various clustered sites. To obviate the need for such redundancy, a more advanced digital data communications network design interposes a "hubbing" site, when possible, so that long distance communications links connect a central site or remote, hubbing sites with other remote, hubbing sites and then only local links are required between the hubbing sites and the remote, non-hubbing sites located near the hubbing sites. The links from a hubbing site to the associated non-hubbing remote drops spread out like spokes from a hub, hence the terminology. The hubbing site usually contains either a time-division or frequency-division multiplexer and demultiplexer to properly switch communications between the long distance link and the local links.

Due to the characteristics of various multiplexers, time-division multiplexing (TDM) is preferred in these systems. Time-division multiplexing allows greater amounts of data to pass through the hubbing site. However, this method requires binary signals, so it is necessary to convert the incoming analog signal into binary signals and then to reconvert the binary signals into analog signals as data passes through the hubbing site. Even so, time-division multiplexers are simpler to construct and operate then are frequency-division multiplexers. The diagnostic circuitry described in application Ser. No. 503,625, however, requires that the remote site and central testing unit be coupled by a "continuous" analog path (e.g., a telephone line); therefore, this diagnostic circuitry cannot be used in these newer types of digital data communications networks which use TDM techniques. Basically, the conversion to a digital form at each hubbing site constitutes a barrier through which analog testing messages cannot pass. A network testing system capable of operation across this digital barrier is shown in commonly assigned U.S. Pat. No. 4,055,808. This latter testing system also permits the diagnosis of problems in a data communications network including multiple computers and their respective communications facilities, from a single site.

The present invention relates generally to the type of network testing and control system shown in U.S. Pat. No. 4,055,808. However, it provides substantial improvements thereover, to accomplish automatic status monitoring of the network components and automatic preventive maintenance (i.e., network performance) testing and to perform additional test measurements and combinations of measurements which cannot be performed with prior art systems.

SUMMARY OF THE INVENTION

In accordance with this invention, diagnostic circuitry is provided which is compatible with prior diagnostic circuitry. This system is flexible and can be used with various types of digital data communications networks. A primary attribute of the system is a high degree of automation which permits the system both to learn the network configuration without manual intervention and continually to interrogate all drops in the system to determine the operational status of all system components; if any parameter or set of parameters changes state, the change is noted and the system automatically ascertains whether a fault condition exists.

A so-called "automatic preventive maintenance" capability is also provided, permitting the system to accept certain commands for execution at a later time so that an operator need not be present to initiate such tests. Typically the tests performed in the automatic preventive maintenance mode relate to the reliability of the communications system and obviate any other simultaneous use of the portions of the system under test. Thus it is highly desirable to be able to schedule them at times when the network is not normally active—e.g., outside normal business hours. The system permits such advance scheduling and obviates the need for an operator to be present at those times; the scheduled tests are automatically performed at their assigned times.

The system is controlled from a single central site in an economical, modular fashion, facilitating the addition of drops to the system as the size of the network increases. Flexibility is maintained through the use of reprogrammable microprocessors as the basic elements of the modules located at the central site. Command and test signals are generated under microprocessor control and thus can be changed with minimum hardware impact.

The aforesaid modular system design involves the use at the central site of a structure having a hierarchy of three "levels" or "tiers" of data processors which are tied together "serially". Each level of the structure has a particular responsibility and performs a unique, defined group of tasks.

The invention is capable both of digital status testing of the equipment in the network as well as analog testing and/or measurement of the communications links and analog communications equipment (e.g., in the modems).

In addition to having automated testing capability, the invention permits testing to be manually initiated as well. An operator at a central site can test any site in the system by selectively entering at a console the port line and drop address of a unit to be tested, together with command instructions regarding the test(s) or other control operations to be performed. The indicated drop site testing unit performs the operation commanded and generates a response which is relayed to the central site.

Operator interaction with the network testing and control system takes place at the central site by means of one or more consoles and printers or other input/output devices. The consoles are "intelligent" terminals which provide both input and output display capability. The printers simply provide hard copy output in a conventional manner. Test results may be displayed on a console or provided as a hard copy output from a printer, or both. Certain tests associated with the automatic preventive maintenance mode are usually performed at a time when an operator is not present, so that a printed copy output is routinely made of the results.

An audio monitor is also incorporated into the consoles. The audio signal on any of the links can be "patched" through the tiers of processors at the central site, to the audio monitor of one or more consoles. The audio monitors include an audio amplifier and loudspeaker, permitting the operator to listen in on the audio lines. An audio alarm signal may be annunciated through the monitor's loudspeaker when it is necessary to draw the attention of the operator—e.g., upon detection of a serious fault condition.

This invention is pointed out with particularity in the appended claims. The above and further objects and advantages of this invention may be readily and thoroughly understood by referring to the following detailed description taken in conjunction with the accompanying drawings.

BRIEF DESCRIPTION OF THE DRAWINGS

FIGS. 8A-8C are a listing of command classes and commands;

FIG. 14 illustrates the special translation sub-mode for the NSF mode;

FIG. 15 illustrates the translation of a short form sequence when the RTM is an MPEXT testing unit;

FIGS. 16A and 16B illustrate the translation of a short form sequence when the RTM is a CLEXT testing unit, under conditions detailed in the specification;

FIG. 17 illustrates codes for the translation of commands;

FIGS. 18A, 18B, and 18C are a summary tabulation of commands showing translation category and response format category; and FIG. 19 is an illustration of the IP's modes of operation.

DESCRIPTION OF AN ILLUSTRATIVE EMBODIMENT

Figure 1:
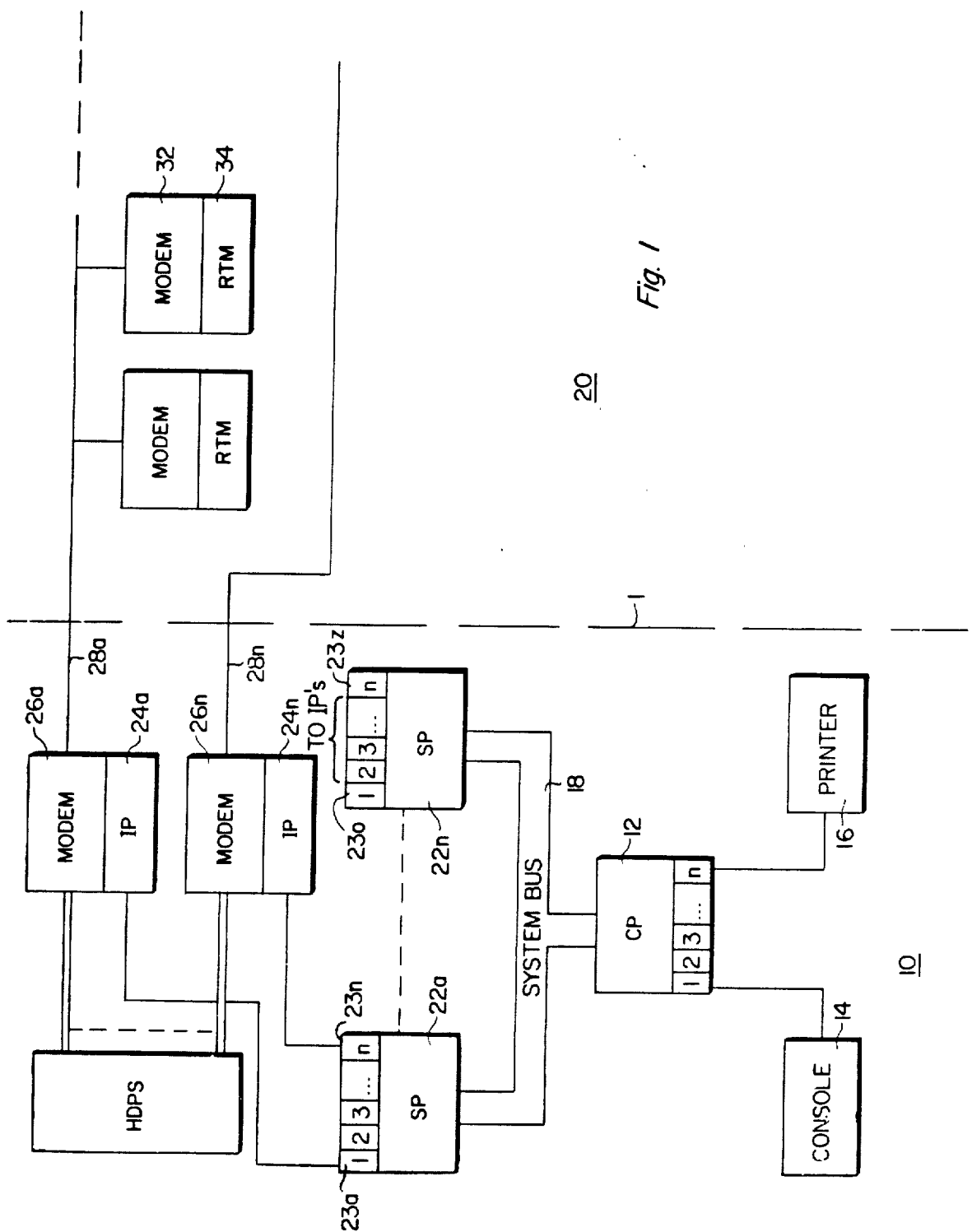
FIG. 1 is a block diagram of the network testing and control system of the present invention.

A general system diagram of the present invention is shown in FIG. 1. Dashed line 1 separates the central site of network testing and control system 10 from the network 20.

The basic system components of the central site 10 include a central processor (CP) 12, one or more console work stations 14 and printers 16 which are connected to the CP for input/output, one or more satellite processors (SP's) 22a-22n which are connected to the central processor 12 and to each other via a system bus 18, and one or more interface processors (IP's) for each of the satellite processors, e.g., IP's 24a-24n for SP 22a. Each interface processor is associated with a "port" of an SP and with a modem, e.g., 26a-26n, respectively, through which the host data processing system (HDPS) connects to the respective communications network lines 28a-28n. The HDPS thus communicates with the hubbing and other remote sites in the network via the modems 26a-26n.

The primary functions of the CP 12 are to act as a scheduler and dispatcher of all activities of the testing system and to handle input and output from and to the consoles and printers. It accepts commands from, e.g., the console 14 and controls all data flow to and from SP's; it also dispatches information to printer 16 and to console 14.

Only one CP is needed for the system. The CP and the SP's are interconnected by a parallel bus 18, the "system bus;" the console(s) and printer(s), however, are serially interfaced to the CP. CP 12 may have several (e.g., eight) ports available for connection to printers and consoles. For example, four ports may be allocated to consoles and four to printers. One SP is used for approximately every eight central site modems, and one IP is used for each central site modem. The number of SP's will thus depend on the number of IP's employed. SP's 22a-22n each have several (e.g., eight) serial interfaces 23a-23n through which they connect to the central site IP's 24a-24n.

Each remote site in the network includes a modem 32 and a remote test module (RTM) 34. RTM addressing, according to the scheme used in the illustrated embodiment, allows up to 10 line numbers per port, and up to 40 drop numbers per line. Each SP may support up to 320 drops spread across its eight ports (due to memory limitations). Further, up to 20 SP's may attach to the system bus 18. Naturally, other implementations would be readily feasible, to permit different degrees of system expansion at each level.

The SP's receive sequences of control and command information from the CP and in response thereto issue direct commands to the IP's. The IP's both translate the SP commands into forms acceptable to the RTM's and transfer corresponding analog signals over the lines 28a-28n. Analog responses received over those lines are first demodulated and then mapped into digital signals by the IP's and then transmitted back to the SP's. The SP's provide the CP with information concerning the results of the tasks performed and/or data regarding system status and error conditions.

It should be noted that the RTM's are, or at least may be, prior art devices such as those described in U.S. Pat. No. 4,055,808 and application Ser. No. 503,625. Compatibility with the RTM signalling format is provided by the transition function of the IP, so the RTM's can have their own signalling format and instruction set. This permits the present invention to be compatible with prior art devices and adaptable for use with test modules. In fact, all the RTM's need not necessarily employ the same signalling format.

SYSTEM COMPONENTS

The CP

The CP, SP, IP and consoles are each microprocessor based subsystems. The microprocessors may, for example, be the type Z-80 microprocessor CPU manufactured by Zilog, Inc. The CP, SP, and IP (and the consoles), in the detailed embodiment illustrated herein by way of example, each contain a Z-80 microprocessor, some amount of read-only memory (ROM) and random-access read/write memory (RAM), and some kind of input/output (I/O) equipment to allow communication with other parts of the system. The CP, for example, is illustrated as having eight I/O ports suitable for the attachment of peripheral devices such as consoles and printers and an interconnection to the system bus 18 for communication with the SP's. In each of the CP, SP's and IP's, the Z-80 microprocessor constitutes the CPU (central processing unit) which is the heart of the particular data processor. The CPU's function is to obtain instructions (and data) from memory and perform the desired operations.

In its memory, the CP keeps several tables reflecting system status. In a "resource" table it keeps track of what devices are attached to the system bus, their type, and numerical designation or address. In a "connect" table it maintains a dynamic list showing the logical connection between an SP port and its designated logging device or console. An "active fault" table is also kept, to record a dynamic listing of all fault types previously identified during the AM mode and remaining unresolved; for practical reasons, a ceiling is placed on the number of such faults maintained in the table. Additionally, an APM schedule table is maintained to keep track of the user generated schedule of APM times and tests; each entry consists of port number, time of day and APM test sequence type to be performed.

The CP dispatches test commands and results and thus acts as a clearing house for the consoles and printers on the one hand and the SP's and RTM's on the other. During AM mode, when an SP elevates a CHANGE response to CP level, the CP directs its status request command to the RTM reporting. The results are analyzed to find the parameter which changed. The fault table is updated by the CP to reflect the result, and a message is sent to the console to indicate that the number of outstanding faults has changed.

The CP initiates APM testing on the ports selected at TOD's selected, as represented in the APM schedule table. When responses to the APM test commands come in, the CP must properly route them from SP to printer.

For manually driven tests, the CP relays the console-generated command to the proper SP. Results from the destination RTM, IP or SP are interpreted and relayed back to the console and/or printer for display to the operator.

The CP also controls the operation of self-diagnostics for itself and the SP's. It generates commands to the devices on the system bus and interprets responses. Self-test results are displayed on the console initiating the test. Components tested during a system self-test include the CP, all SP's and all consoles.

The SP's

The CP initiates all modes other than learn and APM, but the SP must support the action. It must follow proper line protocol by repeating the address/command sequence outbound (i.e., in the direction of the remote site) and must properly spot, qualify and relay the response inbound (i.e., toward the CP). Further, in APM mode the SP must control the test initiation as well as the use of its drop configuration table. The results of the tests run in APM are stored in a buffer for transmittal to CP for printing.

In addition to a Z-80 CPU, and RAM and ROM memories, each SP also includes a universal synchronous/asynchronous receiver/transmitter (i.e., USART or UART) interface for each of the connections possible between the SP and a central site IP. If an SP has eight output ports, for example, it will have eight USART interfaces—one for each port. Each IP interface has seven leads—two audio leads and leads labelled CA, CF, BA, BB and GND. In addition, the SP's interface directly to the system bus 18 and contain analog hardware for switching the selected analog signal to the audio-monitor leads.

The CA, CF, BA, and BB leads are standard; they are discussed, for example, in the above-identified application, Ser. No. 503,625, incorporated by reference herein. The CA lead carries a signal indicating that the SP is prepared to transmit data to the IP. The BA lead carries digital data from the SP to the IP. The BB lead carries digital data from the IP to the SP. The CF lead carries a signal transmitted from the IP to the SP to indicate the detection of a carrier signal.

Manually operated configuration switches (or "straps") in the SP are used to set the following parameters: SP device address (0 to 31), number of ports used (1 to 8), maximum serially-embedded hub level (0 to 7), highest line number (0 to 9), and highest drop number (00 to 39).

The IP's

As previously noted, there is a modem associated with each IP. Both the modem and the IP have a transmitter and a receiver. The modem enables the HDPS to communicate with the remote site terminals via their modems. Also, the IP and RTM's at remote sites can communicate with each other via the same link. The HDPS and remote site equipment transmit data to each other over a specified data channel centered around one or more known frequencies. The IP's and RTM's communicate with each other via a sub channel centered on a different frequency. Thus, both the IP and its colocated modem receive the aggregate signal on the link to the remote site and each "strips off" the signals not of interest to it.

Functionally speaking, the IP decodes outbound signals from the SP and either translates and encodes the signals into the language accepted by the remote site destination, or it performs the appropriate act if the signal is a command which has the IP as its destination. Inbound signals are received by the IP's receiver and decoded. The IP then performs any necessary translation before relaying the signal to the SP.

In addition to implementing the translation function, the IP also makes necessary signal format conversions to accommodate the RTM's characteristics. For example, the RTM's may "expect" certain command signals to be repetitively sent to it until it responds. The SP can simply send the command once; the IP will then repeat the signal, as necessary, to accommodate the RTM's format.

IP's also include apparatus for testing the integrity of their own components and for verifying the correct operation of the colocated modem. Additionally, the IP's include apparatus for performing certain analog tests and measurements. Specifically, the IP's can measure transmitted and received signal levels under a variety of conditions, thus providing a mechanism for evaluating the quality of the communications link and of the modem transmitter and receiver.

MODES

In contrast with prior art single mode operation systems, the present invention provides for operation of the testing and control system in four modes. These are termed, respectively, (1) the "learn" or "self-learn" mode, (2) the "automatic monitoring" (AM) mode, (3) the "automatic preventive maintenance" (APM) mode, and (4) the "manual" mode. The latter is similar to the single mode available in prior art systems. A fifth, idle mode is also provided, but it is not directly involved in network testing.

LEARN

In learn mode, the SP's conduct all operations. Each time it receives a LEARN command from the CP, the SP begins to poll all of its possible site addresses through all of the active ports. It also builds a network configuration table (or site list) in response to the results of its polling. This network configuration table, which resides in the SP, contains the addresses of all active sites served by each SP. These sites are organized, for each SP, by port and line numbers. The table is always cleared of all entries, including disabled sites, before it is rebuilt in response to the instruction of the learn mode. Further, all record of which ports had previously been in APM or manual modes is lost when learn mode is entered. For each site bits may be set aside for various purposes—e.g., to use as a temporary disable flag during AM mode, to indicate that the site has a so called "hot spare" partner, and to indicate a non-responding site. Updates to the table may be made by the user from any console and total update can be accomplished by triggering a new learn mode command.

The SP signals to the CP an acknowledgement of receipt of the LEARN command and signals completion of the learn mode run upon reaching the address space limits of the network. In addition, a count of the total number of sites found on that SP's eight ports is submitted to the CP. The grand total of all sites found by all SP's is sent by the CP to the console initiating the learn operation. This total is displayed to the operator to allow a quick check of the functioning of the Learn operation.

AM

The SP's conduct almost all operations in AM mode. Generally, all ports will be in AM mode except for those specifically designated for manual or APM testing. (In this regard, it is to be noted that each port will support only one test mode at a time.) During the AM mode, the SP's use the network site list compiled during the learn mode to poll all the enabled sites listed in their configuration tables on ports not in APM or manual mode. All active ports are polled simultaneously, in parallel, but the drops on each port are polled sequentially.

In AM mode, the SP treats three different classes of responses from the addressed RTM. The most frequent response is NO CHANGE, meaning that no change in status has occurred for the addressed site since the previous poll. Less frequently, the response is CHANGE, indicating some alteration in status. In this case the RTM is re-polled. If the response still indicates CHANGE, the SP elevates the problem to CP level and the CP assumes command of the problem analysis to determine what has happened. A status request and reply then occur along with audio and visual alarms to the console. If the second try results in a NO CHANGE response, normal polling resumes. Occasionally, there will be no response from a previously active site. Here the SP will wait a predetermined time and then will retry the drop. If there is still no response, control will be relinquished to the CP, as previously noted.

As with the LEARN command, the SP acknowledges reception of the AM command by signalling the CP.

Some sites may be equipped with two modems, rather than one. Upon failure of one modem, it may be switched out of the circuit and replaced by the other. The modem which is standing by as a back-up is referred to as a "hot spare." Switching to a "hot spare", whether actuated remotely from a console or manually at the remote site, is normally detected only in AM mode. When this is the case, the CP will confirm that no actual fault has occurred and update the "hot spare deselected" bit and the appropriate entry in the SP list; the CP automatically then returns the SP to AM.

APM

APM mode allows a user to schedule specific tests to be run at predetermined times and on predetermined SP ports of his own choosing. This permits the running of tests which obviate the normal use of a link of the network in such a way as to minimize the disruption of HDPS service. The most significant type of test of this sort is error rate measurement. APM mode permits the operator to specify in advance a date and time of day (TOD) when such tests shall be performed. The CP records the scheduling of APM tests and, with the aid of a real time clock, initiates the APM test schedule at the assigned TOD's without the need for an operator to be in attendance during the APM tests. The results are recorded on preassigned system printer(s) attached to the CP.

The SP's have maximum responsibility in APM mode. The CP simply specifies the port and the type of test battery to be transmitted to the port. The SP then runs the test on every site on the designated port which corresponds to an active entry in the network site list; the results are transmitted to the CP. In terms of format, the results of all tests on a particular site will be submitted to the SP in a single, predetermined sequence as soon as they have been completed. The SP retransmits the same command over the appropriate port until either the proper response has been received and approved or until the SP decides that a proper response is not forthcoming. In the latter case, the SP notifies the CP in an appropriate manner when results are submitted. Thus, the SP is responsible for examining the responses from the remote units for detecting format violations. The SP also performs whatever data conversion and processing is required so that the submitted results will require a minimum of computation by the CP before being printed out or being displayed on the console.

The SP immediately acknowledges receipt of an APM command, informs the CP whenever results on a site are available, and notifies the CP of completion of testing of all sites on the designated port.

Mode Priorities

Under the direction of the CP, any SP controls each of its ports independently and simultaneously in one of the above-specified five modes: idle, learn, AM, APM, or manual. After powering up the system, all ports are left in the idle mode until directed by the CP to enter another mode. When the learn mode is demanded, all ports are put into learn mode. Once learn mode is completed, the SP is again returned to the idle mode. It is as if the learn mode run had been preceded by a complete system reset. Hence, if the system had been in AM mode just prior to learn mode, it does not re-enter AM mode after the learn mode has been run. This preserves a system protocol rule that the CP initiates all action in the network. If a port had been in the idle, APM or manual mode just prior to a learn mode run, and AM is commanded just after the learn mode run, the port will be AM scanned with the other ports, as if the previous mode had never been designated. Whenever AM has been commanded, if a port is temporarily put into manual or APM mode, it will return automatically to AM mode once its task has been completed or terminated.

The above discussion reflects adoption of the following ordering of mode priorities, from lowest to highest: AM, APM, and manual; idle and learn modes are not included in the priority tree. The idle mode is effectively a default mode when no other mode is selected. By contrast, when learn mode is initiated, all other activities are aborted in the system. Only a CANCEL command will be honored during learn mode operation, to force termination of learn mode. Each port in the system operates independently. If a higher priority is set to run on a port which is already busy with a command, the lower priority job is suspended until the higher priority one is complete. The system then reinstates the lower priority job.

The user may also initiate terminate/cancel commands (PORT or SP) to return a given port or the entire SP to idle mode and to terminate any commands concurrently being executed on that port or SP.

In learn mode, the SP starts from scratch each time to build the network configuration table or site list of all enabled sites. The list is always cleared of all entries, including disabled sites, before rebuilding the table. Furthermore, all record of which ports had been in APM or manual modes is lost in the learn mode, as noted above.

OPERATION AND STRUCTURE OF SYSTEM COMPONENTS GENERAL DESCRIPTION

Figure 2:
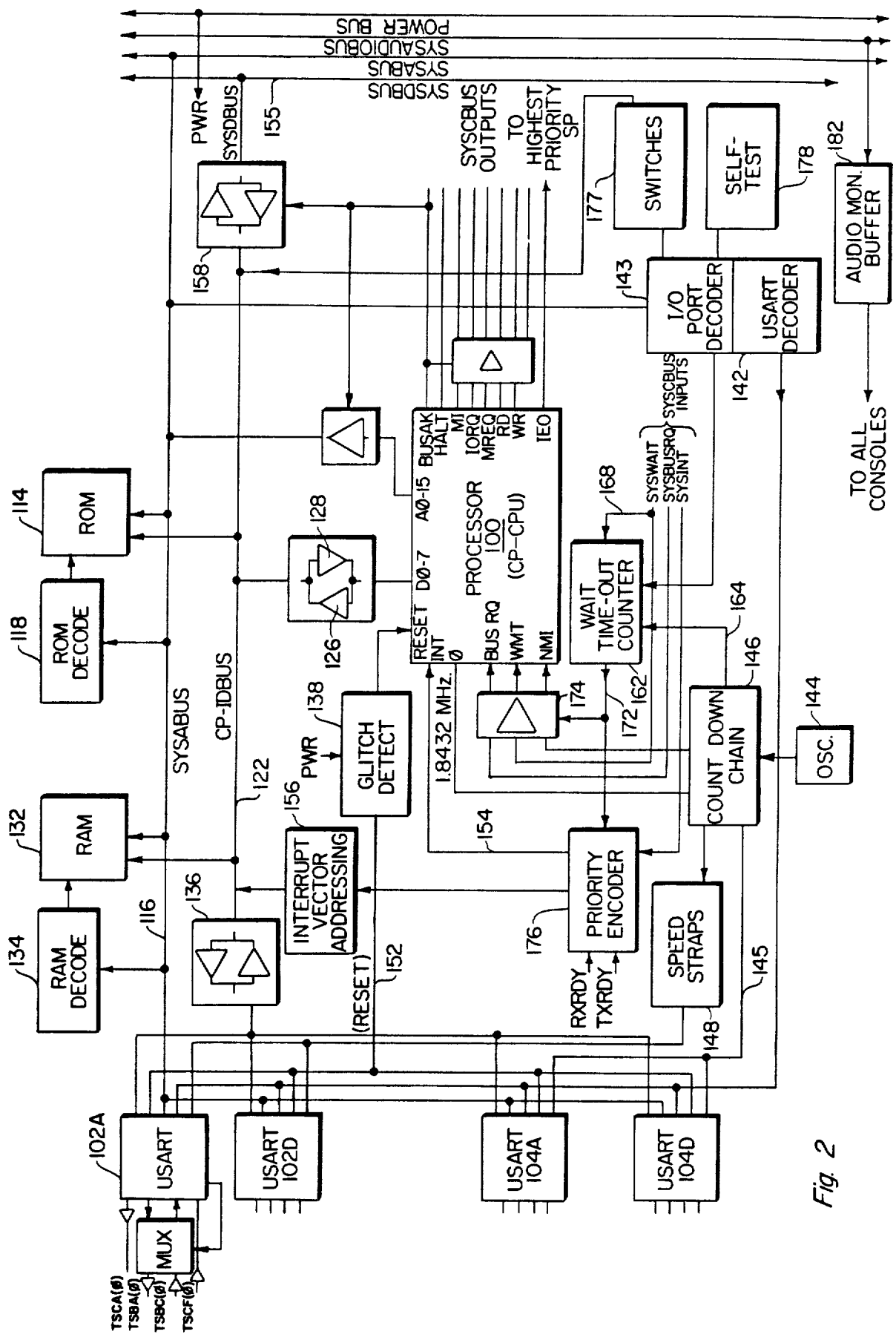
FIG. 2 is a block diagram of the central processor 12 of FIG. 1.
Figure 3:
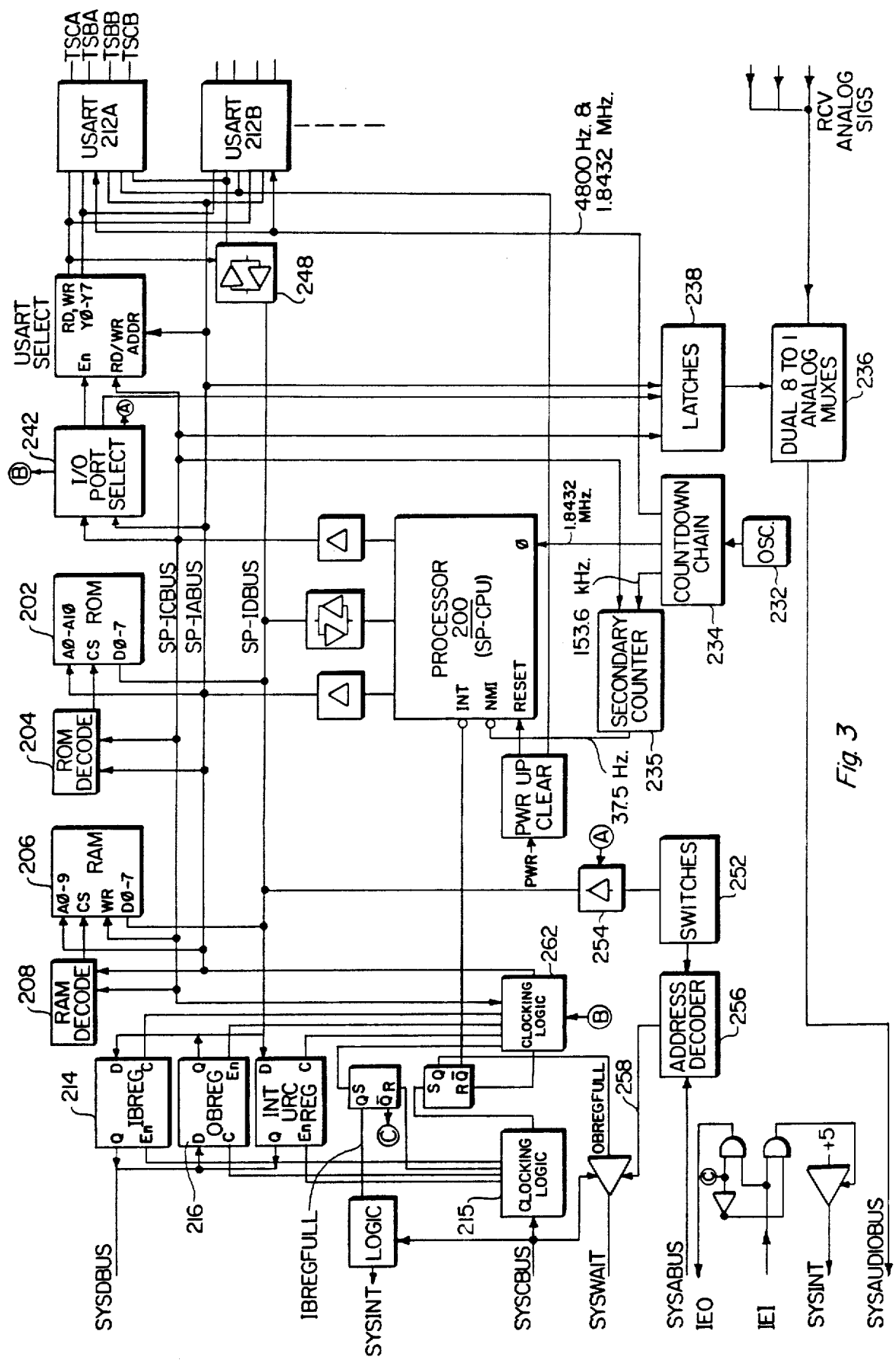
FIG. 3 is a block diagram of a satellite processor $22_i$ of FIG. 1.
Figure 4:
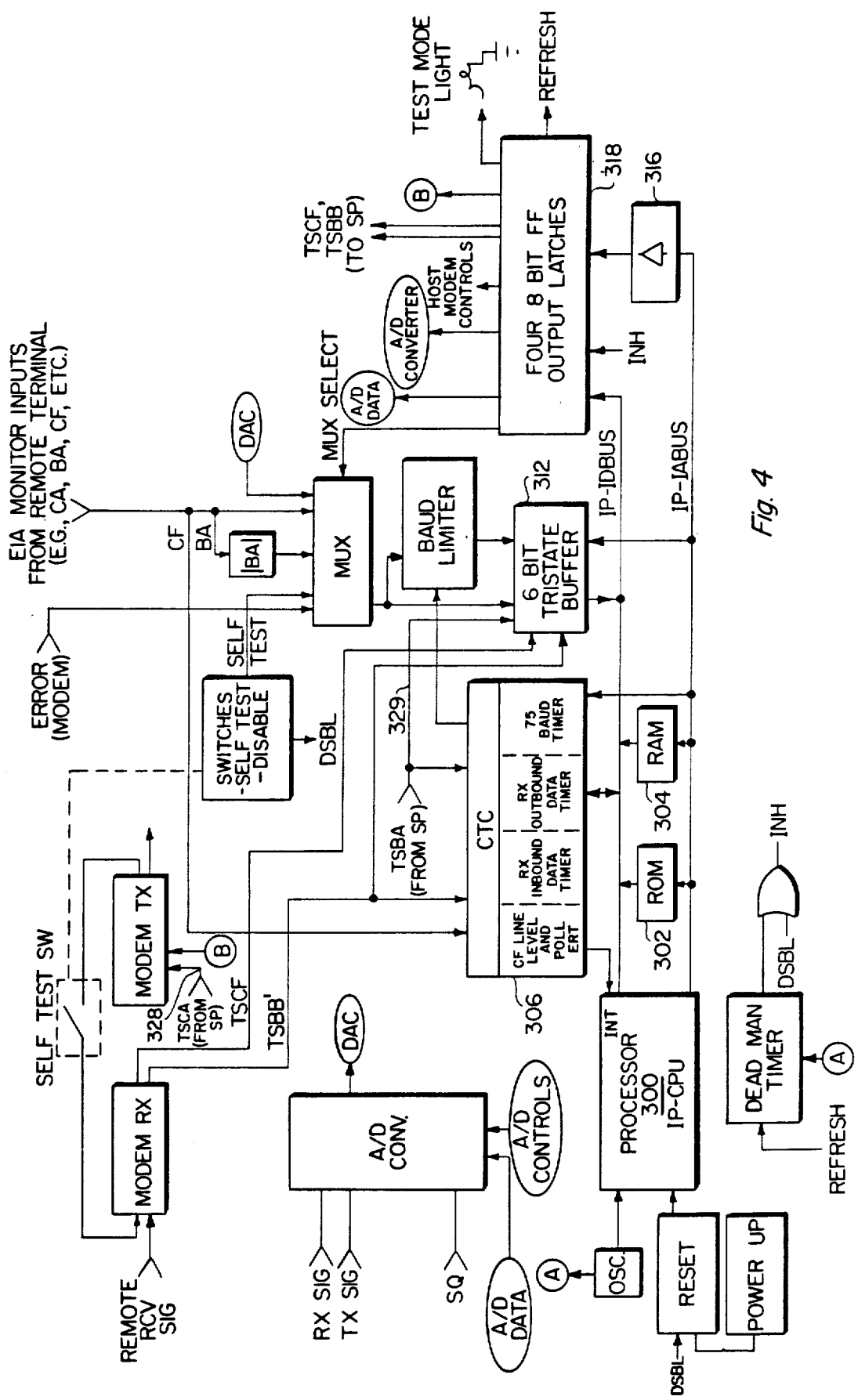
FIG. 4 is a block diagram of an interface processor $24_i$ of FIG. 1.
Figure 5:
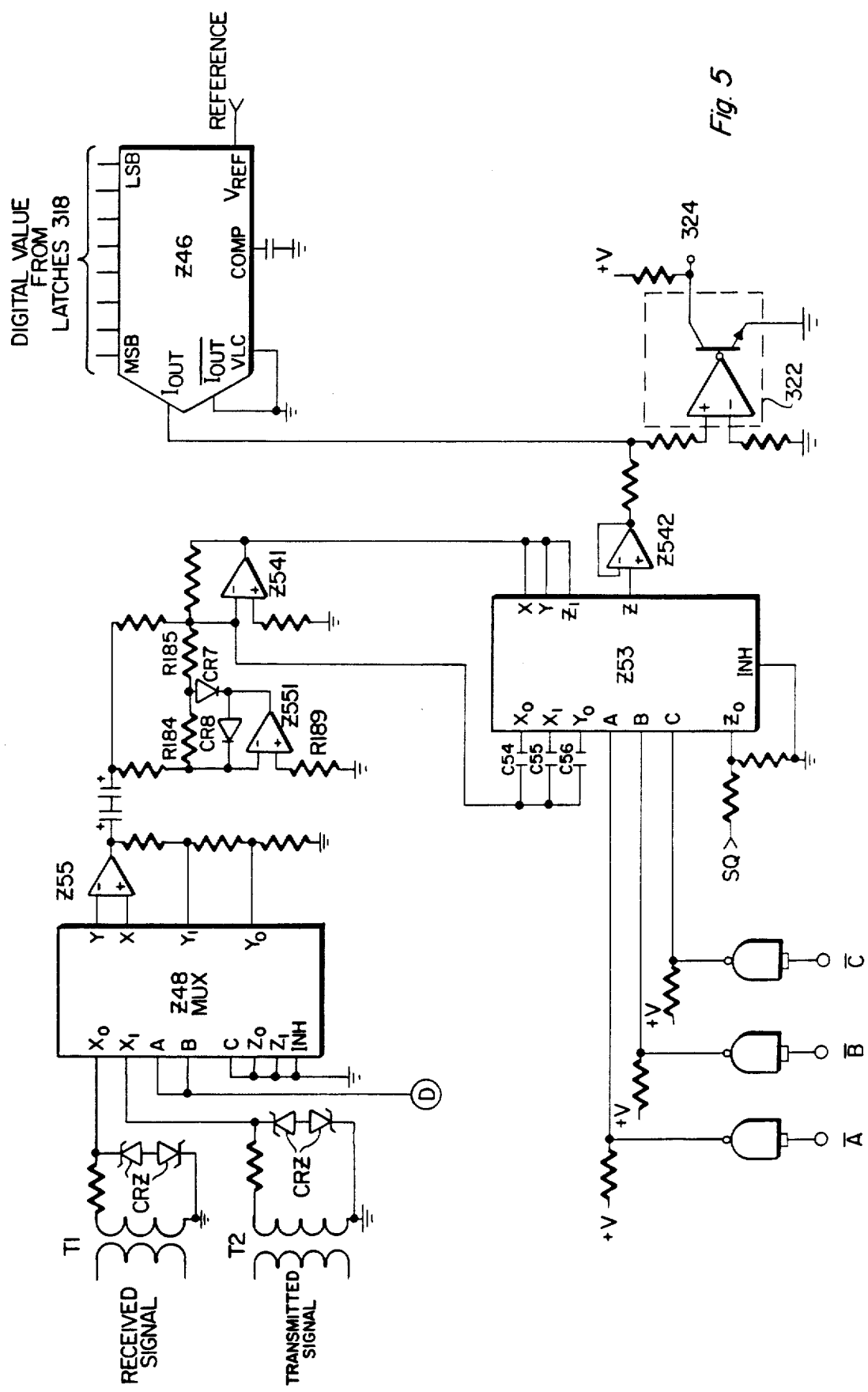
FIG. 5 is a schematic diagram of the analog signal level measurement circuit of the interface processor of FIG. 4.

With this overview in mind, the system and system components may now be better understood by referring to the block diagrams, FIGS. 2-4, and then to the schematic diagram, FIG. 5. The subsequent Figures explain the operational aspects of the system.

The CP

FIG. 2 depicts a block diagram for the central processor 12. As shown in this Figure, the CP centers around the Zilog, Inc. Z-80 central processing unit (CPU) 100. (The Z-80 CPU is a well-known and documented component which is readily available commercially; thus, detailed disclosure of its features and operation need not be repeated here. Among the pertinent documents are the following: "Z-80 CPU Technical Manual" (Zilog, Inc. publication 03-0029-00) and "The Z-80 Family Program Interrupt Structure" (Zilog, Inc. publication 03-0041-00).) The processor 100 is connected to the universal synchronous/asynchronous receiver/transmitters (i.e., USART'S 102A-102D and 104A-104D) for interfacing, respectively, with the consoles and printers. Each of the USART'S is, in turn, connected to one of these peripheral devices through conventional line drivers and line receivers and, if necessary, switching or multiplexing units, as well. For example, USART 102A is shown connected to a pair of line drivers 106A and 106B for transmitting information to the associated console, and to a pair of line receivers 108A and 108B for receiving information from the console. The connection to the driver 106B and the receiver 108B is through a multiplexer 112. It is to be understood that the other USART's are similarly connected to the other consoles and printers, although such connections are not shown. The USART's are standard commercial components and therefore reqire no further detailed explanation; they may, for example, be embodied as Intel Corporation Model 8251 USART'S. For communicating with the SP's, the CPU (or processor) 100 interfaces with a parallel system bus 18.

The operation of the processor 100 is controlled by instructional information (or programming) contained in a read-only memory (ROM) 114. The ROM 114 is addressed via a (14 bit) bus 116 designated SYSABUS. SYSABUS is part of the system bus 18. The ROM and its associated ROM address decoding logic 118 interpret the signals on the SYSABUS so as to fetch stored instructions from the indicated ROM addresses when requested by the CPU; the fetched instructions are supplied to the CPU 100 via an 8-bit bus 122, denominated the CP-IDBUS. Processor interfacing to these two buses is via line drivers 124 in the case of the SYSABUS and drivers and receivers 126 and 128 in the case of the CP-IDBUS. A second memory unit in the form of a random-access read/write memory (RAM) 132, together with associated RAM address decoding logic 134, provides a read/write memory for use by the CP to store appropriate data, tables, etc. RAM 132 communicates with the other devices in this system over the SYSABUS and CP-IDBUS in the same fashion as does ROM 114.

USART×S 102A-102D, 104A-104D are also connected, in parallel, to SYSABUS 116 and CP-IDBUS 122. In the case of CP-IDBUS 122, the connection is via a line driver and receiver unit 136. The USART'S also receive a reset signal from a glitch detector 138, addressing signals from USART decoding logic 142 and timing signals from countdown chain 146.

Timing for the CP is generated by a free-running oscillator 144 feeding a digital countdown chain 146. One output from the countdown chain (i.e., output lead 145) is provided to the USART's 104A-104D which are associated with the printers. Another output from the countdown chain (i.e., lead 147) is provided, through adjustable "speed straps" 148, to the USART'S 102A-102D which interface with the consoles. This situation recognizes that printers and consoles may operate at different baud rates.

Glitch detector 138 monitors the power supplied to RAM 132 in order to ensure that the processor is not erroneously operating on the assumption that the condition of the memory is reliable. Accordingly a so-called "glitch" or brief interruption of power will cause the glitch detector to generate a reset signal on line 152, both to the USART'S and to the processor 100, so that operation does not continue under the false presumption that the overall memory status of the CP is valid when, in fact, it is not.

Almost all information transfers through the CP are interrupt driven, with the notable exception of the operation of "writing" or sending data to the SP's from the CP. Interrupt operation of the Z-80 microprocessor is well documented and need not be repeated here. It suffices to note that a vectored interrupt approach is used. Interrupts are supplied to the processor on the interrupt request input associated with line 154 and interrupt vector addresses are supplied, via interrupt vector address logic 156, onto CP-IDBUS 122.

The CP is provided with a hardware timer (i.e., wait time-out counter 162) to detect the condition of the SYSWAIT line becoming "hung-up."0 The wait time-out counter receives a clocking input on line 164 from countdown chain 146, a control signal from I/O port decoder 143 and the SYSWAIT signal via line 168. If SYSWAIT remains active for 13.3 ms or more, the wait time-out counter provides an output on line 172 to indiate the occurrence of that condition. This output signal gates off a control buffer 174, to defeat the SYSWAIT, SYSBUSRQ and SYSINT signals so as to prevent them from reaching the corresponding inputs of processor 100. Line 172 also feeds priority encoder 176 which returns an interrupt signal on line 154. This interrupt signal overrides non-maskable interrupts and bus requests since buffer 174 is gated off. In response to the interrupt request, the CPU 100 obtains the interrupt vector from interrupt vector address unit 156; the associated interrupt routine which is called for the specified interrupt vector informs the consoles that the SYSWAIT line is "hung up."

Priority encoder 156 also receives two condition signals from the USART's, such signals being designated RXRDY and TXRDY. The RXRDY an TXRDY signals respectively indicate that the USART is ready to have a signal received from it or tramsmitted to it. The RXRDY signal is given the highest priority, since it indicates that a USART is ready to transmit to the CPU; and if the USART is not serviced quickly, the data in its transmit buffer may be lost. Thus, the priority encoder controls the generation of interrupts to prevent loss of data. In response to the interrupt request generated, the processor 100 then obtains the address of the USART via CP-IDBUS 122.

In the illustrated implementation, the CP also includes several manually set switches 176. These switches are set to record the number of consoles and number of printers attached to the CP, or other parameters of interest, such as whether power is being supplied from a 50 Hz or 60 Hz source. Switches 176 are given an address or addresses, as appropriate, and are read as an I/O port(s) having such address(es). The wait time-out counter 162 is also considered an I/O port and all of the USART's are considered a port. Thus, I/O port decoder 143 may designate USART decoder 142 as a port, and the USART decoder will then read the indicated address and designate the appropriate USART. The fourth I/O port designates a CP self-test 178.

For self-testing, the CP causes the USART's to provide a DC loop-back. The returned signals are compared to the transmitted signals, to verify proper USART operation. A check of the vector addressing mechanism is implicit in the USART check. RAM 132 is checked by a read/write comparison bit-by-bit. ROM 114 may be checked by parity verification or other conventional techniques.

Interrupts from the system bus are serviced on a highest-priority first basis. The priority of an interrupt request is determined by the distance between the requesting device and the CP, with the device closest to the CP on the interrupt request line having the highest priority, the device furthest from the CP having the lowest priority and priority following a monotonic progression in between.

The system bus 18 provides the means for the CP to communicate with the SP's and the means for distributing power to the SP's, as well. SYSABUS 116 is tied directly into and comprises part of system bus 18, but CP-IDBUS 122 is only indirectly tied onto the system bus SYSDBUS lead(s) 156 via line driver/receiver 158. Both driver/receiver 158 and driver 124 are controlled directly by the bus acknowledge (BUSAK) output of CPU 100.

The CP also includes an audio monitor buffer 182 which provides an interface between the audio monitor leads in the system bus 18 and the audio leads to the consoles. The system bus includes two audio monitor leads from the SP's (i.e., SYSAUDIOBUS). Under control of the processor 100, the buffer relays the audio signals from the SYSAUDIOBUS leads to the audio monitor of a selected console or consoles.

The SP

FIG. 3 depicts a block diagram of the satellite processors. It will be readily observed that, topologically, at least, the SP's are very similar to the CP. They are based on a similar processor or CPU 200 which may also be a type Z-80 microprocessor, together with associated memory comprising ROM 202, ROM decode logic 204, RAM 206 and RAM decode logic 208. The upstream connection of each SP is to the CP via the system bus 18 and its downstream connection is to the IP's through USART'S 212—212. Each USART is thus designated a "port" of the SP.

SP's transmit data onto and receive data from the system bus in parallel; they communicate through the USART's serially. To bufer data transfers with the CP, the SP contains a pair of registers designated the outbound register (OBREG) 214 and the inbound register (IBREG) 216. The term "outbound" is used to refer to a data flow away from the CP and toward remote sites; conversely, the term "inbound" is used to refer to a flow from remote sites toward the CP. A status bit is generated in response to the condition of each of the registers 214 and 216 for indicating whether the respective register is full or empty. These status bits are respectively designated OBREGFULL and IBREGFULL; they are active in the register-full condition.

When the outbound register fills, the setting of the OBREGFULL status bit causes an interrupt request to be generated to SP-CPU 200. Further, a system interrupt is generated when the IBREGFULL status bit is set and the SP receives an interrupt enable input (IEI) signal. For the highest priority SP, this signal corresponds to the CP's IEO signal; for all other SP's, it corresponds to the IEO signal of the next-higher priority SP. All devices on the system bus having lower priority than the interrupting SP are locked out (during contention for interrupt service) by an interrupt enable output (IEO) signal which is simultaneously provided (in daisy-chain fashion) to such devices by the interrupting SP. This permits the CP to recognize the interrupt request of the highest priority SP. Contention for interrupt is only available when no other SP is being serviced and when the USART's are not being serviced.

Appropriate SP timing signals are provided by an oscillator 323 and countdown chain 234. In the particular illustrative implementation, the countdown chain may, for example, generate 4800 Hz, 153.6 kHz and 1.8432 MHz signals. The 153.6 kHz output of the countdown chain is provided to a secondary counter 235. Secondary counter 235 also receives a reset signal on line 237 from SP-ICBUS 239; as an output it generates a 37.5 Hz signal to the NMI input of SP-CPU 200. The 1.8432 MHz signal is provided to the SP-CPU as its clock. The USART's receive the 1.8432 MHz signal for their CPU's and they receive the 4800 Hz signal for data timing.

The audio leads from the IP's are coupled to the audio leads of the system bus by a pair of 8-to-1 analog multiplexers (i.e., muxes) 236. Multiplexers 236 are controlled by latches 238. These latches are driven by the signals provided on the SP-IABUS and SP-ICBUS and an output from I/O port selector 242.

While SP interaction over the system bus 18 is interrupt controlled, exchanges with the IP's operate by simple, sequential polling techniques. This is made possible by the act that USART's 212a-212n are operated at a relatively low speed (e.g., 75 bps) bidirectionally; thus, the CPU cycle is very fast by comparison and obviates the need for interrupt-driven operation.

Outbound register 214 and the associated decoding, enabling and clocking logic 215 receive information directly from the CP over the SYSCBUS leads of the system bus 18, without requiring the involvement of the SP CPU 200. However, the outbound register 214 cannot receive a byte from the CP if it is full, otherwise the information contained therein will be lost. To guard against this happening, the SYSWAIT signal must be checked by the CP before it tries to write to an SP. The addressed SP will detect and decode its address on the system bus, recognize that it is the destination, and place the SYSWAIT line in an appropriate state to indicate whether the OBREGFULL status bit is set or not set. The received data can be transferred from the outbound register, via 8-bit SP-IDBUS 244, to one of four destinations: RAM 206; ROM 202; SP CPU 200 (via receiver/driver 246), and a selected IP (via receiver/driver 248 and the appropriate one of USART's 212a-212n).

Each SP is provided with a number of switches 252 to be manually set to certain system parameters. These parameters are the address of the SP, the number of ports used on the SP, the maximum line and drop adresses on that SP, and the maximum number of serially-embedded hubs ($N_{HM}$) downstream of that SP. These switches are treated as a port which may be addressed by I/O port selector 242. The switches are connected to SP-IDBUS 244 via a driver (i.e., tri-state buffer) 254 which is controlled by the I/O port selector. The SP address switches are also read by address decoder 256 which compares the switch-indicated address with the device addresses placed on SYSABUS. The output of address decoder 256, provided on line 258, indicates whether the specific SP is the one whose address is present on the SYSABUS; when the addresses match, the signal or line 258 assumes a predetermined state. In turn, this signal is combined with the OBREGFULL status bit for generating the SYSWAIT signal.

The inbound transfer of information first requires a transmission over SP-IDBUS 244 to fill the inbound register 216. When the inbound register is full, its status bit (IBREGFULL) is set. The setting of IBREGFULL initiates an SP-to-CP transfer. The transfer takes place over the SYSDBUS lines in system bus 18. Specifically, a two-cycle transfer is involved. During the first cycle, the SP specifies the address (i.e., vector) of the destination of the information; and during the second cycle, the actual information is sent over the bus.

The IP

A block diagram of the IP is shown in FIG. 4. This tier of the system is also implemented as a processor/CPU 300, together with its associated ROM 302 and RAM 304 memories. A Z-80 microprocessor is, as indicated above, well suited for use as the processor 300. A counter-timer "chip" (CTC) 306 (such as the Z-80 CTC manufactured by Zilog, Inc. and intended to be compatible with their Z-80 CPU) provides inbound and outbound data timing and other necessary counting and timing functions. The IP receives outbound control signals and data from its associated SP via lines 328 and 329, respectively. Line 329 feeds a six-bit tri-state buffer 312. The output of buffer 312 is supplied to IP data bus 314 which connects the processor 300, CTC 306, ROM 302, RAM 304 and buffer (i.e., driver) 316, as well. Buffer 316 is a set of gates, simply providing appropriate drive for flip-flop output latches 318.

The IP includes circuitry for measuring received and transmitted analog signal levels. This circuitry, depicted in FIG. 5, comprises an analog-to-digital converter which includes a successive approximation digital-to-analog converter (DAC) which is driven by processor 300. Transformers T1 and T2 couple the received signal and transmitted signal, respectively, to the line level measurement circuit. The secondaries of transformers T1 and T2 feed the inputs of multiplexer Z48 through resistors R171, R172, respectively, and back-to-back zener diodes CRZ are provided across both inputs of the multiplexer to limit the level of the applied signal. The selected signal which is present at the output of multiplexer Z48 is first rectified (by amplifier Z551, diodes CR7, CR8 and associated resistors) and then actively filtered. The filter is comprised of operational amplifier Z541, resistors R187 and R188 and one of three possible filter capacitors C54, C55 and C56. The appropriate one of the three possible filter capacitors is selected by multiplexer Z53 in response to the signals provided on its A and B inputs. This permits the filter response to be matched to the characteristics of the signal being measured. The state of the signal on the A input of Z53 determines which of its $X_0$ and $X_1$ input terminals will be connected to its X output terminal. The signals on the B and C terminals of Z53 similarly control which input terminals are connected to the Y and Z outputs, respectively. The output of the active filter appears at the X and Y outputs of the multiplexer Z53 as well as pin 7 of Z541. This filtered output is also supplied to terminal $Z_1$ of multiplexer Z53 and thus becomes the Z output of the multiplexer when the signal on its C input causes the Z output to be taken from the $Z_1$ input. Otherwise, the Z output of the multiplexer Z53 is taken from the $Z_0$ input. The output of the multiplexer (from the Z terminal) is buffered by a follower Z542 and then compared with the signal supplied by the DAC Z46 by simultaneous application of the two to the summing node 322 of a comparator 324. The state of the comparator output 326 indicates whether the estimation signal driving the DAC is less than or has exceeded the analog signal level being measured. The comparator output voltage is provided as a logic level so that it can be sensed by the IP CPU 300. In turn, the processor 300 devises a new approximation or estimation of the measured level and changes the output of the DAC Z46 accordingly. This cycle is repeated until the output of the comparator changes state, indicating that the relationship of the CPU-generated value to the measured value has reversed—i.e., the approximation "overshot" the actual value. At that point, the digital signal driving the DAC Z46 is stepped in the opposite direction until the comparator state once again changes. This process continues, with the CPU successively and alternately approaching the measured signal level until the DAC output corresponds to the audio signal level measured, within the resolution capability of the system.

As indicated above, the Z output of multiplexer Z53 may correspond either to the rectified and filtered output of multiplexer Z48 or the signal applied to the $Z_0$ input of multiplexer Z53, with the selection being dependent upon the state of the signal applied to the C input. The signal which is supplied to the $Z_0$ input of multiplexer Z53, via resistor R248, is termed the SQ (i.e., signal quality) signal. It is supplied by the modem which is associated with the IP as a DC level indicative of the quality of the received signal.

The IP has a designed-in capability for self-testing. In fact, two types of self-testing are possible, one automatic (i.e., it is conducted automatically under program control) and the other manually initiated. The manually initiated self-test is the more comprehensive of the two, as it essentially includes (as a subset) the automatically operated self-test.

In the automatic self-test, the IP's ROM, RAM and CTC are checked. The ROM is tested with a conventional parity check procedure. The RAM, however, requires more active testing. Data is written into each RAM location and then read out of that location. A combination of data words is used which permits comparison of the written and read information in such a way as to reveal any short- or open-circuited RAM locations. To check out the CTC, a command is sent to it which normally would cause it to produce an interrupt request signal after a fixed time delay. If that signal is not produced or is produced only after a time delay which deviates more than a predetermined amount from the expected time delay, the CTC fails the test.

In order to understand the manual self-test, it is necessary first to explain the dead man timer. The dead man timer operates as a fail-safe mechanism. It is constituted as a counter or timer driven by a fixed frequency, free-running clock. When the hardware and software components of the IP are operating in a substantially normal fashion the timer is periodically refreshed (i.e., reset). Significant deviations from normal operation will result in the reset signal not occurring at the intended time. This will permit the dead man timer to overflow or "time-out", a condition which is detected. In response to this event, the test module is disabled through the generation of a NMI (i.e., non-maskable interrupt) signal.

This self-test is important because the IP is situated at a critical location in the network, where it can command any modem downstream to go off-line or into loop-back. Thus it is important to detect and disable grossly abnormal behavior due to hardware failures. After a failure occurs and is detected, either through the automatic or manual self-test, the IP continually tries to check itself in case it is able to recover. If it finds itself able to perform certain basic functions, the disablement condition is removed and the IP returns to normal operation through the power-up sequence.

If in response to the manual initiation of a self-test, no failure is noted from the operation of the dead man timer and NMI, the above-described automatic self-test is performed next. If the IP survives the automatic self-test, it then proceeds to test the analog transmitter and receiver of the IP and incidentally tests the transmitter and receiver in the modem with which it is associated. To do this, it transmits a message through the analog transmitter of the IP in the form of an SP command. This message is looped-back into the analog receiver of the IP via the manual self-test switch. It is then decoded and treated as though it were an SP signal. Consequently, the IP enters the commanded mode; the command is to perform a modem test with error indication. Thus, the modem is placed into a self-test mode. During this operation, a test mode light comes on in the IP, so there is a visual indication that the associated circuitry is passing the test. While the self-test is being performed, the IP and modem outputs are disabled.

Console

The system consoles which provide input and output functions from the CP are so-called "intelligent" consoles by virtue of having their own internal processors. That is, they perform certain processing on their own and carry on certain interactions with the console operator without requiring any transmission to or from the CP. The consoles are also built around a Z-80 microprocessor CPU 400. As specifically implemented in the illustrated embodiment, the console consists of a gas discharge display panel, alphanumeric keyboard having a number of non-standard special function keys or switches, audio monitoring circuitry, processor, memory and timing circuitry, line drivers and receivers and a USART for interfacing with the CP.

Figure 6:
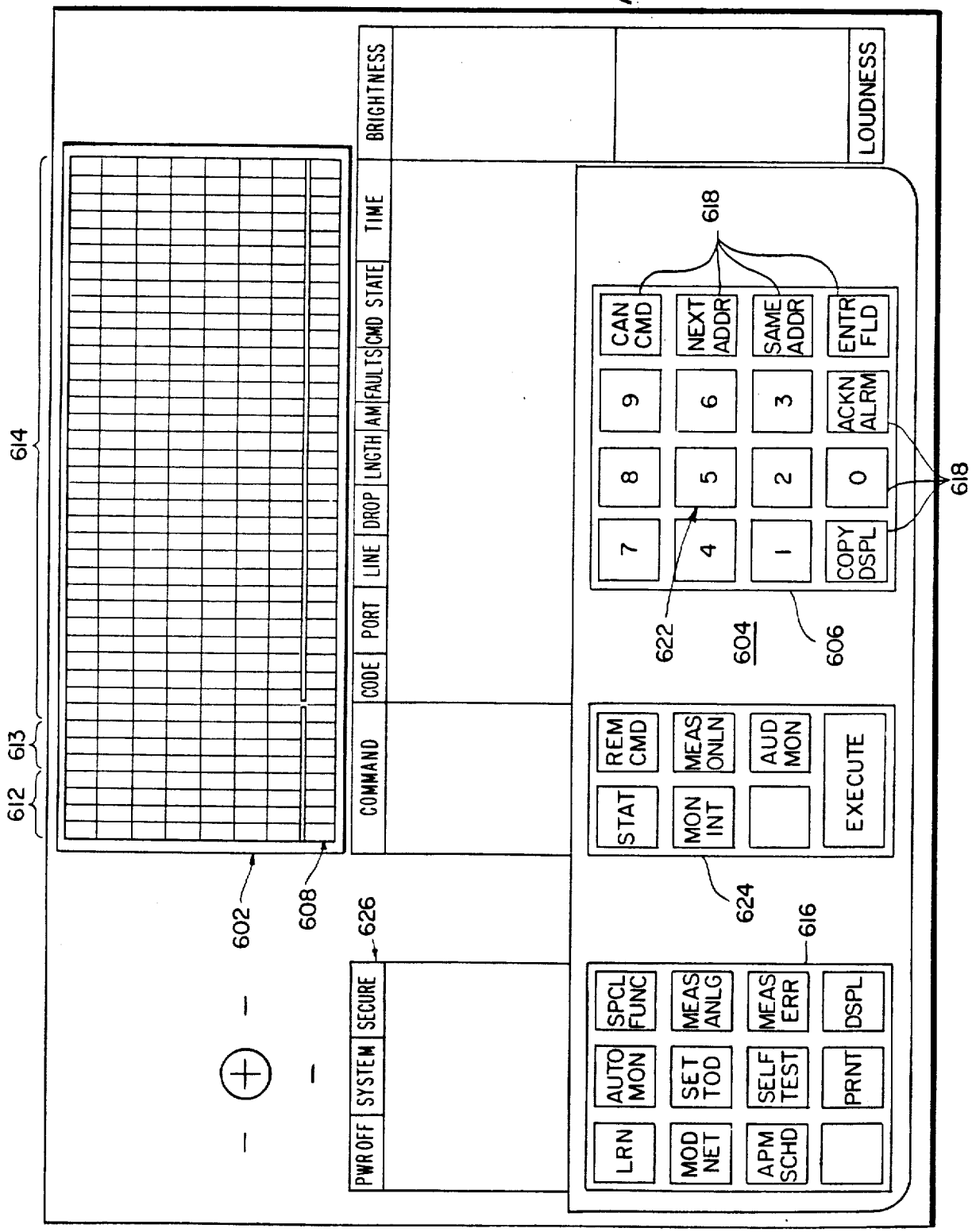
FIG. 6 is an illustration of a display and keyboard arrangement for the consoles of FIG. 1.

Consoles provide the control level interface between the human operator and the network testing and control system. In the example discussed herein and illustrated in FIG. 6, the console comprises (1) an eight row by forty character alphanumeric display 602, (2) a thirty-five key special purpose keyboard 604 including a decimal key pad 606, and (3) an audio-monitor and alarm function. The console is a Z-80 microprocessor based intelligent terminal with firmware allowing for simple interactive communication between the CP and the operator.

As explained elsewhere, the console requires a serial interface to the CP through a USART.

Regardless of the particular display means employed, the display panel is divided into four sections: a command section 608, a prompt section 612, a message section 613 and an information section 614. The command section shows the entering of commands and their associated parameters for execution. In the example, this is the bottom row (i.e., row 8 consisting of forty characters) of the display. The prompt section is used to guide the operator for proper keying sequence. In the illustrated embodiment it uses the first eight columns on rows 1-4. The message section, comprising the first eight columns on rows 5-7, is used to display system messages. The information section is used for: displaying for selection, all the commands in a command class, and displaying results, if any, for the command being executed. It comprises the remaining portion of the display amounting to a 224 character capacity, in the illustrated embodiment.

The console keyboard 604 has thirty-five keys divided into four categories. There are twelve SYSTEM COMMAND class keys 616, six MANUAL COMMAND class keys 618, ten NUMERIC (i.e., decimal) keys 622, and seven FUNCTION keys 624.

Console firmware is used to provide prompting to the operator so that input is keyed in sequences for proper command formation and execution.

An audio signalling capability is provided in the console to allow the system to get the operator's attention and to permit the operator to listen in on line signals. For this purpose, a speaker and an amplifier with a volume control adjustment are included. The console's speaker and amplifier may also be used to provide a beep or other signal to signify to the operator an improper keying sequence, or invalid entries.

Figure 7:
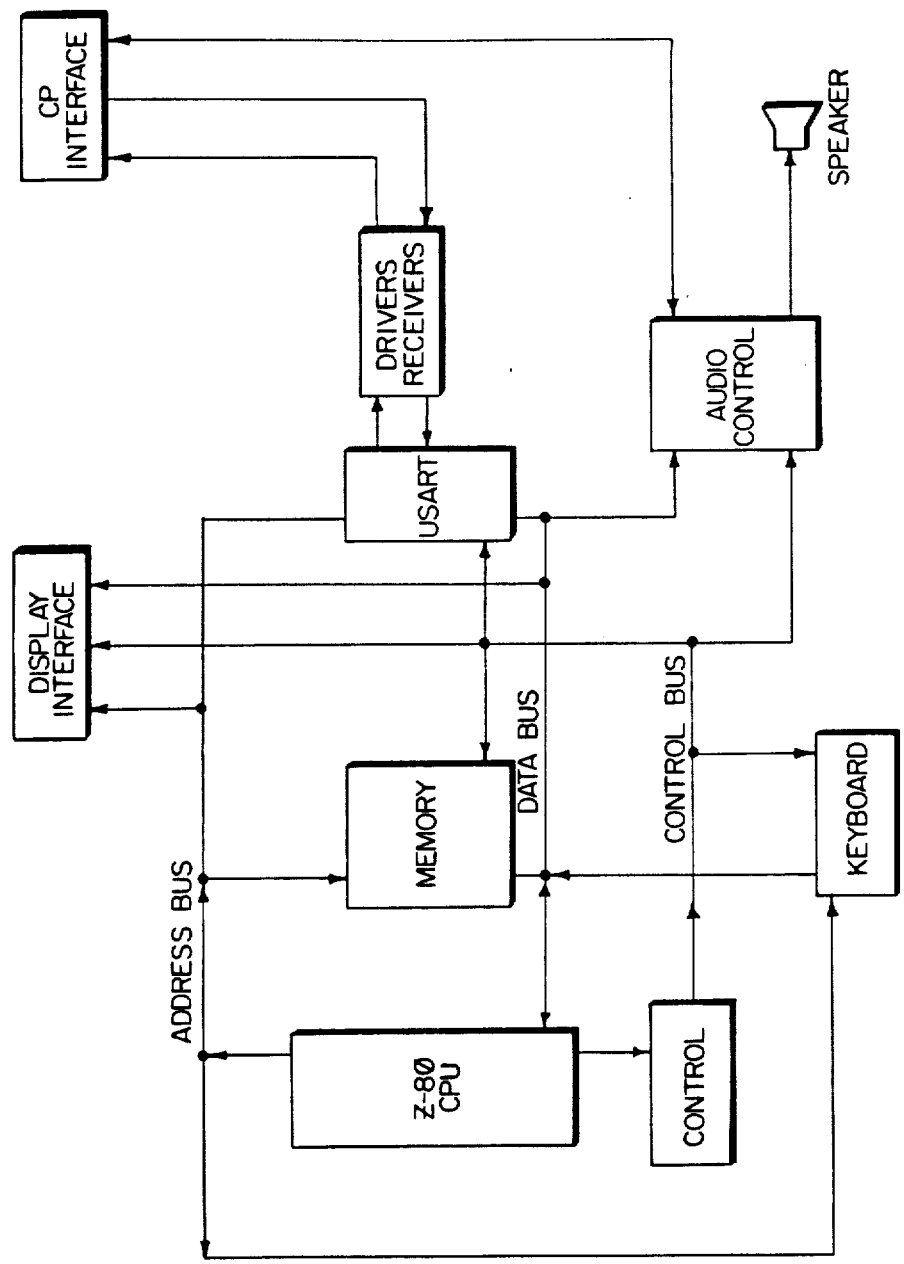
FIG. 7 is a block diagram of a console 14 of FIG. 1.

A block diagram of a console is shown in FIG. 7.

The operator controls all system activities by executing commands formed at the console. Commands are formed by the operator depressing a command class key and choosing a command and its parameters as dictated according to system design and console prompting. When a command has been formed, the operator then depresses the EXECUTE key and the system takes control until results, if any, are displayed during and/or upon the completion of the command procedure.

Keying sequence is governed by the command state and the prompting provided by the console's CPU. There are eight command states: IDLE, INPT, RDYX, HOLD, RUN, COMP, ABRT and DSPL. In the IDLE state, the console is idling and scanning for inputs from the keyboard and CP. In the INPT, a command parameter may be entered, as prompted. In the RDYX state the console is ready to execute the command which has been entered; that is all necessary command parameters are entered and the command will be set into operation upon depressing the EXECUTE key. The RUN state occurs in connection with console-CP interaction initiating the execution of a command, signifying that the command is in progess. The console is in the COMP state at the completion of a command execution. The HOLD state is entered by the console whenever a complete command has been sent to the CP but no reply (including a simple ACK) has been received from the CP. After a reasonably long length of time (e.g., 2 sec) the console will revert to IDLE state from HOLD, and list an error message in the message section—such as "No Response, CP-Console." The ABRT state is entered when a command in progress is manually cancelled from the console keyboard. DSPL state implies additional console-CP interaction is needed from the keyboard, for displaying lengthy tables.

The function of the CANCEL CMND key depends upon the state of the console. If the console is in IDLE, it stays in that state and clears the display. If the console is in INPT or RDYX, it goes to the IDLE state and clears the display. If the console is in RUN or DSPL, it will abort manual or I/O commands being run or learn mode and will go to ABRT. If the console is in COMP or ABRT, the display will be cleared and the console will go to the IDLE state.

The twelve system command class keys implement certain commands of a particularly significant nature. These keys function only when the system is not secure and the command state is either IDLE, COMP or ABRT.

The NEXT ADDR key is an option on certain commands that have at least port, line and drop for parameters; its function is to fetch the address of the next site on the line relative to the one being queried. It is operable for the following command classes: status, monitor interface, remedial commands, measure analog on/line, measure error rates, measure analog off/line, special function and enable/disable site.

The SAME ADDR key is functional on certain commands that have at least port, line, drop as their parameters. It is used when the operator wishes to execute a new command on a site that was queried immediately prior to that command so that the address of the site need not be reentered.

The COPY DSPL key causes the MESSAGE, INFORMATION and COMMAND sections of the display to print out onto the device assigned to the copy function. This key is functional when the command state is either IDLE, COMP or ABRT.

The ENTR FLD key is used for closing parameter entries.

As a way of alerting the operator, whenever a key is depressed out of sequence, or an invalid parameter entry is being closed by keying ENTR FLD, a light "beep" will be generated through the audio amplifier and loudspeaker mentioned above.

FIG. 8 provides a listing of console command classes and commands. The commands which relate to each command class are listed under the heading designating that command class and the necessary parameters for the command are shown in parentheses after each command. The parameter abbreviations are as follows: P (for port), L (for line), D (for drop), E (for length of test; figured as $10^E$), T (for time), DT (for date) and DV (for device).

Figure 9:
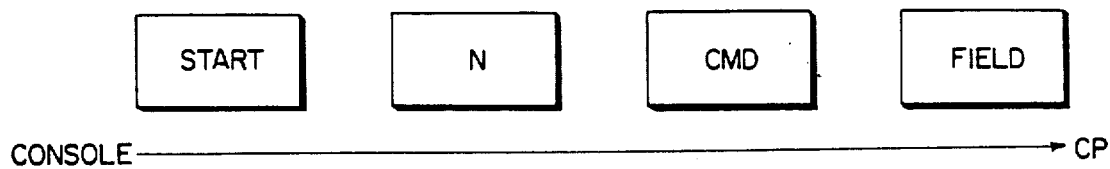
FIG. 9 is an illustration of the structure of console-initiated commands which are sent to the CP.
Figure 10:
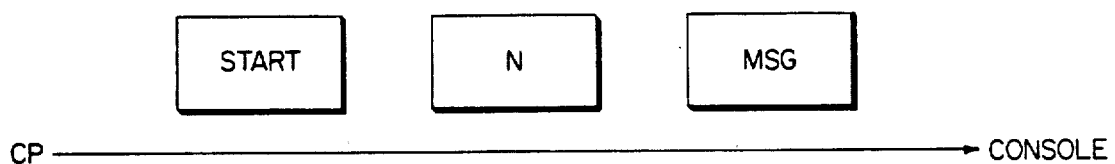
FIG. 10 is an illustration of the structure of CP responses to console-initiated commands.

Console-initiated commands which are sent to the CP have the structure indicated in FIG. 9. With reference to that Figure, START, N and CMD are one byte frames. FIELD can vary in length, with its length being dependent upon CMD. Similarly, the structure of CP responses to console-initiated commands is illustrated in FIG. 10, wherein START and N are again one byte each and message can vary in byte length according to the command to which the CP is responding. N gives the number of bytes to follow in that message.

The CP acknowledges receipt of commands from the console by giving back a simple ACK response. Commands which have a long run time send an acknowledgement back right away. Commands which have short run times send an acknowledgement back upon completion (i.e., they cause the console to go directly into the COMP state from HOLD).

CP initiated messages are framed in a different, unique byte set. This allows instant recognition by the console of CP-initiated or console-initiated messages.

The console display, in addition to providing an alphanumeric read out, is also used to display or "paint" an image of a digital waveform. In particular, this enables the display of remote terminal and modem signal waveforms. For this purpose, the selected signal is remotely sampled at the remote site according to prior art techniques illustrated, for example, in the above-identified references. The samples are transmitted to the IP at a 37.5 baud rate. The IP transmits to the SP at double that rate, 75 baud. Therefore, for every five samples received by the IP, it adds 2 "dummy" values according to a known algorithm, adds parity, start, and stop bits, and transmits the 10-bit word upstream to the SP. The SP transmits to the CP and the CP to the console. The console discards all but the five valid samples. The console then responds to the serial stream of valid samples from the CP. For each sample, the console steps across and illuminates one column of a designated row (or rows) of the console display. A sample value corresponding to "ON" or "1" at the remote site mapped to a cell of the display is illuminated as a horizontal line at a high location (i.e., near the top) within the cell display area and a sample value corresponding to "OFF" or "0" is shown as a horizontal line at the bottom of the cell display area. Successive bits appear in adjacent columns of the same row until the allotted number of columns on the row are used up. Then, if more than one row is being used for waveform "painting", the "scan" "retraces" to the starting column of the next row.

Short-duration changes of state may be revealed by "waveform painting" as a result of the inclusion in the IP and RTM's of a baud limiter which essentially "stretches" relatively short-duration changes of state of the monitored signal. This baud limiter may, for example, be one such as disclosed in the above-referenced commonly assigned patent/applications.

System Bus Architecture

System bus 18 provides the physical interface which permits data transfers between the CP and SP. It is defined as consisting of the following leads: SYSABUS bit leads 0–12 and 14; SYSDBUS bit leads 0–7; SYSM1; SYSMREQ; SYSIORQ; SYSRD; SYSWR; SYSHALT; SYSWAIT; SYSINT; SYSBUSRQ; SYSBUSAK and SYSBUSAUDIO.

All system bus signals except SYSBUSAUDIO correspond directly and exactly to the un-prefixed corresponding signal leads of the Z-80 CPU on the CP board, except that (1) the active states of system control leads may differ from the Z-80 active states, (2) during bus acknowledgment the CPU is effectively "removed" from the board—e.g., the SYSRD and SYSWR leads maybe used by the bus-requesting SP to read and write data into and out of it, rather than into and out of the CPU, and finally (3) SYSWAIT and SYSBUSRQ are overridden in order to release the CPU whenever (a) SYSWAIT has remained active for what threatens to be an indefinite period or (b) the voltage supply for the memory drops to a dangerously low level for a duration which may render the memory unreliable—that is, a glitch occurs. Under either of these conditions, an appropriate message is transmitted to the console(s) to inform the operator(s) of the situation.

In addition, there is an interrupt enable input (IEI)-/interrupt enable output (IEO) daisy-chained signal running from the CPU board through all SP's. This signal is used to facilitate the interrupt priority structure more fully described elsewhere in this disclosure.

There are three types of machine operations which may occur on a system bus between CP and SP's: inbound data transfer, outbound data transfer and controller interrupt. Inbound data transfer involves the signals on the SYSABUS, SYSDBUS, SYSIORQ and SYSRD lines. Outbound data transfer involves the signals on the SYSABUS, SYSDBUS, SYSIORQ, SYSWR and SYSWAIT lines. Controller interrupt involves the IEO/IEI signals and SYSINT, SYSM1, SYSIORQ and SYSDBUS. Only one of these three types of operations may be in process in the system bus at any time. Consequently, the system bus interface is half duplex.

All transfers over the system bus are interrupt driven. That is, the device intiating the transfer will trigger an interrupt in the device intended to receive the transfer. Second, all transfers are single-byte transfers as far as the hardware is concerned. Multiple byte transfers are effected completely through the software.

System Bus Data Transfers

An inbound data transfer involves a defined sequence of events. First, the state of the SP's inbound register is determined by reading the IBREGFULL status bit while doing an I/O READ from an appropriate address (e.g. 001XXX0XB). The SP cannot proceed to transfer data until the IBREGFULL status bit is inactive, signifying that the previous word the SP wished to transfer has been taken by the CP. After it has been determined that the inbound register is "empty," the SP's CPU may load an 8-bit character into the inbound register by doing an I/O WRITE to the appropriate device address (e.g., 001XXX1XB). The hardware detects the execution of this machine cycle and sets the IBREGFULL status bit, causing the SP to contend for vectored interrupt priority (as elsewhere described). Once the SP has secured priority, the CP will execute the interrupt service routine for that SP, during which the inbound register would be read by the CP executing an I/O READ to a designated address. Under the scheme particularly illustrated, this address may be 1SSSSSXX. That is, the SP's device address appears on SYSABUS leads 2 to 6, with SYSABUS lead 7 high to indicate that this I/O cycle is addressed to a peripheral connected to the system bus. (SYSABUS lead 7 is always low during I/O cycles addressed to "internal" (i.e., CP associated) peripherals.) On completion of the CP's I/O READ, the hardware will clear IBREGFULL to remove the request for interrupt service.

While outbound data transfers are also interrupt driven, they are hardware independent of inbound data transfers. Specifically, SP's trigger interrupts in the CP for inbound transfers while, conversely, the CP triggers interrupts in the SP's for outbound data transfers. The outbound interrupt is much simpler than the inbound interrupt structure.

All interrupts for inbound data transfers utilize the Z-80 mode 2 vectored interrupt structure. Hence, the address vector which points to the address of the appropriate service routine must be loaded into the vector register before the SP demands an interrupt. This is accomplished by an I/O WRITE of the appropriate vector to a designated address e.g., 001XXX0X. (the X's indicate don't-care bits). In order to minimize the unreliability of this register as a memory element, the vector is loaded into the vector register just prior to each interrupt.

Because more than one SP is attached to the system bus, there is the possibility of contention for interrupt service and the need to resolve such contentions. That is, an "upstream" device (i.e., an SP which is electrically nearer to the beginning of the IEI/IEO daisy-chain) will always be serviced before servicing a downstream device. Nested interrupts are not implemented in the system bus architecture. In other words, contention for service after the selection of a device to be serviced is not available. The software must mask interrupts while executing all service routines. Hence, the worst-case time required for an SP with higher priority to obtain service will be equal to that of the longest service routine executed by the CP's CPU.

After an SP has reloaded its vector register and loaded its inbound register with new data, the IBREGFULL status bit is set, causing the hardware to request interrupt service by enabling a tri-state driver which pulls SYSINT high, provided that SYSM1 is inactive (i.e., low). If SYSM1 is active, SYSINT will not be pulled high until SYSM1 returns to its inactive state. Whenever SYSM1 is active it signifies that the CPU of the CP is either (1) performing an op code instruction fetch cycle, during which time the CPU does not sample the state of (INT) its interrupt input anyway, or (2) performing an interrupt acknowledge cycle, during which SP's are not allowed to apply for interrupt service, so that the IEI/IEO daisy-chain signal has time to ripple through and settle. Thus, SYSM1 serves as a gate in time, during interrupt acknowledge cycles. While SYSM1 is inactive, the gate is open, and all SP's may apply for interrupt service. When SYSM1 goes active, the gate is closed, and the SP's cannot apply for interrupt service unless they have done so while the gate was open.

When SYSINT has been pulled high by one or more SP's, this state will be detected on the rising edge of the last clock ("T") of any machine intruction cycle. On the next rising edge of the CPU's clock, the CP will begin an interrupt acknowledge cycle by setting SYSM1—unless SYSBUSREQ is active (indicating a bus request) or NMI is inactive (indicating an non-maskable interrupt). The interval between the times when SYSM1 goes active and when SYSIORQ goes active is 2½ clock cycles long. It is during this interval that a resolution of contention for interrupt service is assured, since no SP may apply for interrupts during this interval.

The resolution of interrupt contention is implemented with a ripple priority scheme using the IEI/IEO leads to daisy-chain interrupt signals through the SP's from the CP. Whenever an SP requests interrupt service by pulling the SYSINT lead high, it also brings its IEO lead low. That signal is fed as IEI into the next SP, causing it to withdraw any request for interrupt service that it may have made and to not make any subsequent request until IEI returns active. That is, the interrupt request (INTER) condition is given by

INTER = (INTER PENDING) (IEI), where INTER PENDING (i.e., interrupt pending) is set as soon as SYSM1 is inactive if the IBREGFULL status bit is set, and is reset when the IBREGFULL status bit is reset. In addition, the IEO lead of the next SP is also brought low, to eventually force all SP's downstream of the highest priority SP requesting service to withdraw their control of the SYSINT line. Hence,

IEO = (LEI) (INTER PENDING).

2½T cycles between SYSM1 and SYSIORQ are allotted by the CP's CPU to allow this information to ripple through the IEI/IEO daisy-chain. The IEO lead from the CP is active unless its status monitor or one of the CP's USART's requests service.

By the time SYSIORQ goes active, only one SP is pulling the SYSINT lead high, and it is the SP which is allowed to put its interrupt vector on the data bus. Thus, the vector enable signal is given by

VEC ENAB = (INTER PENDING) (IEI) (SYSM1) (SYSIORQ)

The CP's CPU uses the obtained interrupt vector to perform a look-up to the memory address of the proper service routine for the interrupting device and this service routine is immediately executed.

To initiate an outbound data transfer, the CP simply executes an I/O WRITE to an appropriate address, e.g., 1SSSSSXX. If the SYSWAIT lead remains low while SYSWR goes active, it indicates that the outbound register is ready to receive the data. When SYSWR returns low, the data will be latched into the outbound register. The hardware will set the OBREGFULL bit which, in turn, triggers an interrupt of the SP's CPU. Reading the outbound register during the interrupt service routine by doing an I/O RD from address 001XXX1X will reset OBREGFULL.

Until OBREGFULL is reset, the SYSWAIT lead will go high (i.e., active) if the CP initiates another data transfer, indicating that the SP has not read the last data byte written to it. The CP's CPU will react to this signal in the normal manner by maintaining all outputs in the same state until SYSWAIT returns inactive, at which time it will conclude the I/O WRITE cycle. Thus, the maximum time the CP must remain in the wait state is equal to the SP's service routine time. A hardware timer on the CP (i.e., the wait time-out counter 162) defeats the SYSWAIT, SYSBUSRQ and SYSINT inputs to the CP's CPU if SYSWAIT remains active 13.3 ms or more. The CP's CPU will then be interrupted by circuitry which even overrides non-maskable interrupts and bus requests in order to demand that the consoles be informed of the SYSWAIT line being hung up.

Serial Transmission Disciplines

With the exception of the CP-printer and SP-IP disciplines, all serial transmission disciplines have similar message format: SYNC-N-CMD/RESPNS, where SYNC and N are each one byte long and the CMD/RSPNS field is of variable length. N gives the number of bytes in the CMD/RSPNS field. A CP-printer message is simply composed of a data field.

The formats of each character in the serial messages vary, depending on the exact link in the system which is described. Between console and CP the character format is 11 bits asynchronous, comprising a start bit, 8 information bits (LSB first), an even parity bit, and a stop bit. Between CP and printer, character format is 10 bits asynchronous, with even parity. Between SP and IP character format is 10 bits asynchronous with even parity.

Character codes on the printer-CP link are standard USASCII codes. On the other two links the codes are a mixture of EMS, NCS and USASCII codes as described above in the "Console" section and below in the "IP Signalling Functionality" section.

Error Control and Buffer Control

All messages sent between the consoles, CP, SP and IP must be acknowledged, as an operational safeguard. The transmitted signal consists of a SYNC character followed by N (the length in bytes of the message which follows) and the message. Acknowledgement of receipt sent back to the transmitting unit consists of the SYNC character, N and an ACK byte. If this acknowledgement sequence is not received, the transmitting device will repeat the message after a suitably long time out period (e.g., 1 sec.). This will be attempted a predetermined number of times or length of time at the end of which the transmitting device will assumme the presence of a system or equipment failure. In most cases an error message is then relayed to console(s) or printer(s). The printers do not acknowledge messages received and are an exception to these rules.

IP Signalling Functionality "Characters"

In communications from an SP to an IP, the character set comprises four characters: sync, line, drop and command. The sync character comprises 7 bits of ones and an eighth bit containing parity, also normally a one. The line character consists of five bits for designating a choice of one of 32 lines in binary code, one bit comprising a short form flag, one bit comprising a learn flag and one bit for parity. The short form flag is 0 for learn or AM and one for commands. The learn flag indicates reset status and is a 1 for learn and 0 for AM or commands. The drop character is comprised of six bits for designating one of 64 drops in binary code, a single bit which is always 0 and a bit for parity. The command character comprises 7 bits for designating one of 127 commands and one bit for parity. A command code listing is provided elsewhere; note that the condition of all 7 active command bits being ones is invalid. Command characters are not present when the short form flag is 0.

The IP test module recognizes one of 32 line addresses and one of 64 drop addresses, preprogrammed to always be line 0, drop 0 as its own line drop address.

Figure 11:
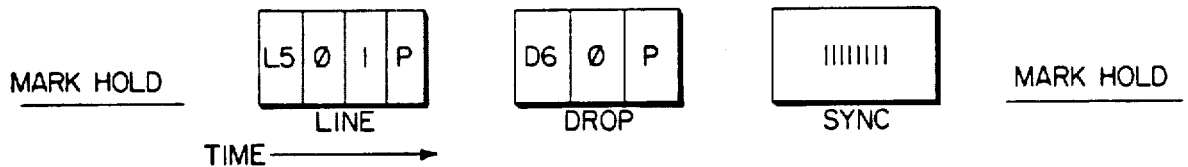
FIGS. 11-13 illustrate the outbound character protocols in learn, AM and NSF modes, respectively.
Figure 12:
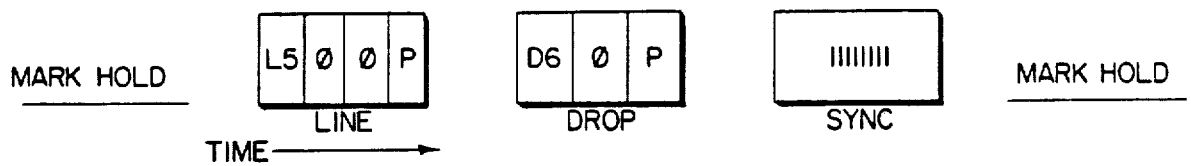
Figure 13:
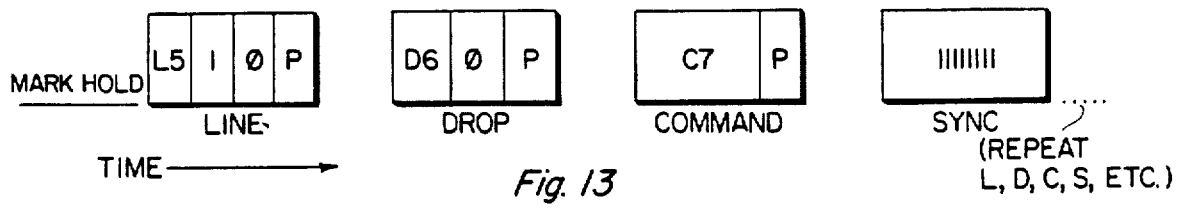

FIG. 11 illustrates the outbound character protocol in learn mode. Likewise, FIGS. 12 and 13 indicate the outbound character protocols in AM and not short form (i.e., command) modes.

Sync characters permit recovery of character framing. The sync character is distinguishable from line, drop and command characters. However, line, drop and command characters are distinguishable from each other only by their positions in the sequence, as defined by the location of the sync character. Transmissions are sent as a single sequence of three characters (i.e., a triplet) in short form or repeating sequences of four characters (i.e., a quartet) when not in short form. Transmissions should not stop in mid-sequence because sequence framing must be maintained and it is undesirable to send the sync character at the beginning of a new sequence. It is more efficient to send the sync character at the end of a sequence in short form. A mark hold between sequences is optional.

From an IP to a remote site, communications are conducted in the "language" of the remote site unit. This may, for example, be the so-called "NCS" language indicated in the aforesaid U.S. patent application Ser. No. 503,625 and U.S. Pat. No. 4,055,808, or some other language, as appropriate. For ease of discussion, the language used between the "SP's and IP's is hereafter referred to as "EMS language" or "system language" and the language used between IP's and RTM's will be referred to as "NCS" language.

IP Translation Functionality/Operation

The IP's of the present invention have two major modes of translation. These are referred to as short form (SF) mode and not short form (NSF) mode. The algorithm for entering and leaving these modes is described elsewhere in this disclosure. Within NSF mode there are two sub-modes of translation: normal and special. The special translation sub-mode is used only when the IP is in Test Mode, Two Drop Test (TMTDT). That mode involves the performance of tests in which two drops participate. The special translation sub mode is, to be more precise, used only when the IP is one of the two drops and the actions involved in the test must be controlled by a complex sequence of commands (e.g., the Polled ERT or Status Snapshot commands).

In NSF mode, normal translation sub-mode characters are received, verified for parity, framing and tag bit errors, translated and retransmitted. This is done on a character-by-character basis, one character at a time. Received characters are translated to transmitted characters according to predetermined algorithms. The translation algorithms, of course, depend upon the language used by the remote site RTM's. For the illustrated example of remote site RTM's using NCS language the below-specified translation is implemented.

Sync characters are translated to Pad characters. Line characters are translated in one of two ways, depending upon the nature of the RTM. As explained in U.S. Pat. No. 4,055,808, a collocated testing unit may connect either to a remote testing unit at a terminal or to a hubbing testing unit at a hubbing site. The former connection is designated an "MPEXT" connection and the testing unit is designated as an MPEXT testing unit. The unit is characterized by the second connection is designated as a "CLEXT" testing unit. If the RTM is an MPEXT testing unit, the translation is to a Pad character. If the RTM is a CLEXT testing unit, however, lines 0-9 are translated directly and lines 10-31 are translated to Pad characters. Drop characters are translated directly for drops 0-39 and for 40-63 are translated to Pad characters. Command character translation depends upon the address and the command and is more fully specified below.

The special translation sub-mode for the NSF mode is diagrammed in FIG. 14. As shown there, there are two phases in this mode. First, before the inbound signal (TSCF) is found on, outbound transmission is the same as in the normal translation sub-mode. Second, after TSCF is found on, indicating that the communication link is established, outbound transmission consists of free-form ("F") characters. These free-form characters are not related one-to-one with the sequence transmitted by the SP. They can be any sequence of characters in the NCS character set. The particular sequence depends on the command which the IP is executing. The characters received from the SP are still verified as above. Outbound transmission continues in this sub-mode until TMTDT is exited.

Figures 16B, 19:
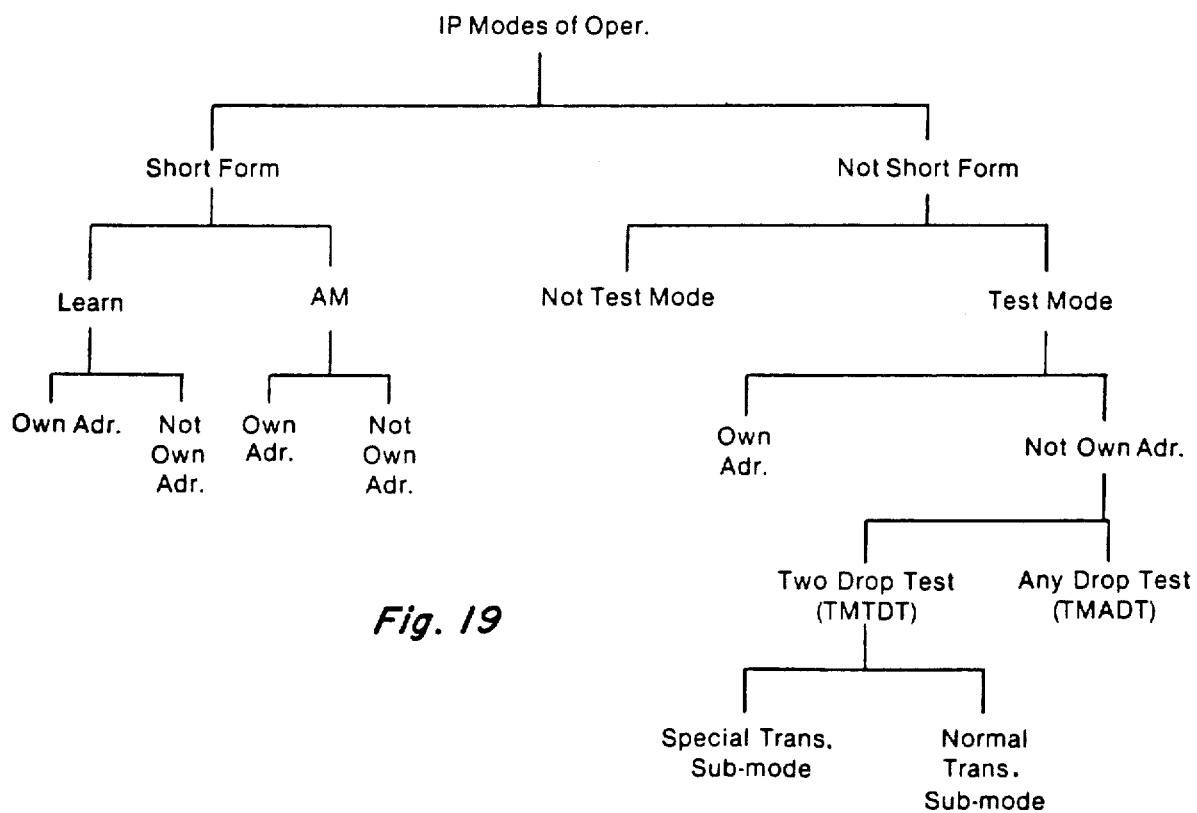

In short form mode, characters are individually received and verified for parity, framing and tag bit errors. Translation and retransmission are done for the entire character sequence as a single group. The translation of a short form sequence (i.e., the IP's output) when the RTM is an MPEXT testing unit is shown in FIG. 15. When the RTM is a CLEXT testing unit, translation depends upon the whether the received line character is the same as the last received line character. If it is, the translation is the same as for an MPEXT testing unit. If not (i.e., the address is different or short form mode was just entered), translation is illustrated in FIGS. 16A and 16B. FIG. 16A illustrates the translation when a new line address must be transmitted and FIG. 16B illustrates the translation when the same line address is assumed. It should be noted also that the translations in FIGS. 15–16(A) and (B) pertain to AM mode; in learn mode, the $C_0$–$C_7$ characters would be deleted and the C character would be Monitor PT in NCS language (i.e., monitor terminal power).

Determination Of Characters In Short Form Sequence

The determination of characters in a short form sequence involves a very simple procedure. First, it is necessary to clear the inbound channel of the carrier associated with the previously addressed drop, unless the new drop is on the same line. Once the channel is clear, the carrier from the selected address is turned on. One of two techniques may be employed to determine when to turn on the latter carrier. The first technique is to examine the TSCF signal and to transmit line characters until the TSCF signal goes off to indicate that the inbound channel is clear and then to turn on the next drop. This hand shaking procedure is intended to allow the IP to function in a network having an arbitrary number of hub levels and therefore not having a defined response time associated with the command for the carrier to turn off. Alternatively, however, a worst case response time may be assumed and the new carrier turned on at the end of that interval. The latter alternative actually may be slightly faster in some cases for the following reason. It the assumed worst case response time for carrier to turn off is less than the time needed to transmit the message causing the next address to turn on, then it is not necessary to wait for the carrier to turn off before transmitting this message. This is true when the new drop is on the same line, so the second alternative is preferred then.

A "bogus drop" character is used to cause a previously selected drop to exit the test mode quickly. The bogus drop character is in the format of a valid drop character with an invalid address; thus, all modules react as though a different module is being addressed. The line character is translated as in NSF mode; it causes a previously line-selected testing unit to exit the line select mode, thereby blocking a response in the test mode; or it causes the testing unit previously in the test mode to exit the test mode. Drop characters are translated as in NSF mode. Command characters must be generated by the IP test module since none are received in the EMS language. The choice of command depends upon the whether the mode is learn or AM, which is determined by a tag bit in the received line character. In learn mode, the command is translated to the NCS command which tests for terminal power. In AM mode, the command is chosen from the set of status monitor commands.

NSF Mode: Command Translation, Inbound Transmission Formats and Local Actions.

The translation of outbound command characters and the translation of inbound responses from the remote, hub and collocated modules for reception by the SP and local actions taken by the IP in response to commands are dependent on the command transmitted by the SP to the IP and the location to which the command is addressed. Four categories of command translation exist, each designated by a letter or letters. These are: (1) Code Change ("C"); (2) Substitution ("S"); (3) Local Use ("L"); and (4) Special Translation ("ST").

For commands which exist in both the EMS and NCS languages, only a simple code change is required. Line and drop addresses are irrelevant. Even if addressed to the IP (i.e., line 0 drop 0), the command is retransmitted anyway. This is the C category.

Some commands cannot be translated by a simple code change, but can be simulated by substitution of one or more commands, provided they are addressed to certain locations. Depending upon the received command, the transformation is either (a) a translation into NCS language ("S-C") or (b) a translation into NCS language with a time-dependent sequential, translation algorithm ("S-S").

Commands which cannot be translated into the NCS language but which can be used at the IP are in the Local Use category, provided they are addressed to certain locations. Local action is taken by the IP if in test mode, but outbound transmission is halted until a command from another category is received.

Commands which call for the Special Translation sub-mode once the IP enters TMTDT are in the ST category. When not in TMTDT or when in the first phase of the sub-mode, translation is similar to the Code Change category. When in the second phase of the sub-mode, translation is free-form and depends on the command.

It is noted that when a translating category depends upon an address, the most recently received line and drop characters determine the category.

The codes for translation of commands are listed in Table 17.

There are five inbound response format categories which describe the nature of traffic on the inbound test channel. Format depends on the outbound command last received by the IP. A response is transmitted inbound only if the requirements for doing so are met for the mode the IP is in. The five categories are as follows:

ACK, Updating Single Byte, Updating Double Byte, Fixed Triple Byte, and Error.

In the ACK category, the IP sends repetitive series of ACK characters to the SP. The IP expects to receive a steady mark from another test module when not itself in Test mode.

In the Updating Single Byte format category, the IP sends to the SP in Single Byte format, updated each character time. The IP receives mark or space bit-by-bit from another test module when not in Test mode itself or when TMTDT.

In the Updating Double Byte format category, the IP sends to the SP in Double Byte format, updated each two character times. The IP receives mark or space from another test module when not in Test mode itself or when TMTDT.

In the Triple Byte category, the IP sends to the SP in triple byte format with characters remaining unchanged. Two commands use this format: Request for Status and Status Snapshot. Other test modules do not participate in the former. In the latter, however, the IP receives mark or space from another test module when TMTDT.

There are also certain rules which govern the use of specific characters in connection with inbound transmission from IP to SP. For example, the SYNC character is sent in inbound traffic periodically to enable character framing to be reestablished if it is lost. This SYNC character is the first character sent after the response begins and it may, for example, be sent in place of every twenty-four information character. The SYNC character is also sent when the module is not yet ready to send an information character. This occurs, for example, in a level measurement test or polling test when the test is not ready to begin. Also, because RTM's do not send SYNC characters, the IP must insert a SYNC character in the translated traffic for the SP when it receives a response from another test module. Specific error characters are reserved for inbound transmission to enable an IP to signal when it has been given an improper instruction (command) or when an inbound response received by the IP is detected as being invalid, (e.g., having incorrect parity). An error character is also reserved for indicating that a command received from the SP is one that cannot be performed at the IP's Own Drop Address.

A summary of commands showing translation category and response format category is provided in FIGS. 18A, 18B and 18C.

Receiving And Responding To Outbound Traffic

The way the IP test module handles inbound traffic and takes willful actions depends on its mode at the time. The mode, in turn, depends on what outbound traffic has been recieved. FIG. 19 illustrates the IP's modes of operation.

In short form mode (Learn or AM), Own Address, the IP executes actions and responds with a "packet." A packet is a fixed time-duration response of one character only. When transmission of the packet is completed, the IP immediately exits the "Own Address" state.

In short form (learn or AM), Not Own Address mode, the IP executes actions and responds with a packet only if an inbound carrier (received from a downstream location) is detected.

In NSF mode and Not Test mode, the IP executes no actions but does translate RTM responses. A response is transmitted inbound if the last command received outbound is not in the Local Use category and the inbound carrier is detected. When the inbound carrier detector turns off, transmission of the response is terminated, even if in midcharacter.

In NSF mode and Test mode at its Own Address, the IP executed actions for the command received when the Test mode was entered. These actions are tests or measurements on its own host modem. A response is transmitted inbound to the SP in ACK, single, double or triple byte response format, depending upon the command. All actions and responses continue as long as the IP is in Test mode. When exiting Test mode, the normal states of all outputs are restored.

Certain tests/commands involve two drops—for example, end-to-end error rate test or level measurement. Specifically, in FIG. 19, note the entry under NSF mode, Test Mode, Not Own Address, Two Drop Test. For these commands, the IP (line 0, drop 0) enters Test Mode Two Drop Test ("TMTDT") when another drop on line 0 (not drop 0) is addressed. The exception, however, is the Status Snapshot command, for which the IP enters TMTDT when any other drop number or line number is addressd. As long as it is in TMTDT, the IP executes actions for the command received when Test mode was entered. When exiting Test mode, the normal states of all outputs are restored. When in TMTDT, responses are transmitted inbound as long as an inbound carrier (from a downstream location) is detected. This guarantees that the other drop is participating. Response format can be single, double or triple byte and can be generated from information gathered internally from the IP, received from the other drop, or both.

Certain tests/commands in the Local Use category are acted upon by the IP when another drop is addressed. These are commands for which information has been collected previously and stored in the IP and to which the RTM itself is unable to respond. These are indicated on FIG. 19 under the entry for NSF mode, Test Mode, Not Own Address, Any Drop Test. For these commands, the addressed drop does not participate in the test at all. The IP executes actions for the command received when the test mode was entered. It manipulates the internally stored information and then transmits a response inbound (i.e., ACK or triple byte format) for the command as long as it is in Test Mode Any Drop Test (TMADT) mode.

Algorithms for Entering and Exiting Modes

The IP enters and exits its various modes by receiving outbound data from the SP in the system language and by decoding it according to the following algorithm.

Character framing is established by a start bit following a stop bit (or stop bits—i.e., steady marks). The sync character corrects framing when it is erroneous. Sequence framing (i.e., distinguishing line, drop and command) is established by the sync character.

To determine whether short form or NSF mode is indicated, the short form flag is monitored when the device is not in Test mode. The most recent flag determines whether short form or NSF mode is indicated. To change from Test mode to short form mode, it is necessary first to exit the Test mode by virtue of inactivity or continuous sync characters or other exit stimulus.

When in short form mode, selection between Learn and AM modes is determined by a flag bit in the most recent line character. To enter Own Address mode while in short form mode, an IP must detect its own line and own drop as a single sequence pair of two consecutive valid characters. A sync character resets the sequence counter indicating the order of the pair; an inactivity timer which senses inactivity for more than a predetermined time (e.g., 0.3 seconds) also resets the sequence counter. Own Address mode is exited after transmitting a packet inbound.

In NSF mode, the algorithm for entering the Test mode is more complicated and redundant than for other modes because the consequences of accidentally entering test mode are serious. To enter the Test mode, a sequence counter which indicates that the next character is expected to be a line, drop, command or sync character is initialized to "line" whenever the sync character is received and the IP is not in Test mode, and whenever leaving Test mode due to inactivity. The counter has four states in the NSF mode and is advanced from state to state upon the successive detection of characters. Two consecutive groups of characters (i.e., quartets) must satisfy certain conditions to cause test mode to be entered. The line characters, as denoted by the counter, must match the IP's own line code and be valid characters. The drop characters, as denoted by the counter, must match the drop code for the device and be valid characters. The command characters, as denoted by the counter, must be the same and be valid characters. Sync characters must also be correct. Framing (i.e., start and stop bits) and parity errors for any character cause the character to be invalid. When a line or drop character is expected and the flag bits are wrong, the character is invalid. When a command is expected, a sync character or any unused command code is invalid.

TMTDT is entered if the line code matches the IP's own line code, neither drop character matches the IP's own drop code and the command is a Two Drop Test. TMTDT is also entered if neither drop character matches its own drop code or neither line character matches it own line code, and if the command is Status Snapshot.

TMADT is entered if neither drop character matches its own drop code or neither line character matches its own line code, and if the command is an Any Drop Test.

Exiting Test mode is also somewhat complicated. Two consecutive quartets with at least one valid or otherwise non-qualifying character in each one cause test mode to be exited. Non-qualifying characters are line, drop or command characters not matching the line, drop, or command code received when test mode was entered. Inactivity is also a cause for test mode to be exited and a manually operated switch may also be provided for this purpose, to be used in case of equipment failures. Once in test mode, the sync character does not reset the sequence counter; however, when a sync character is expected, a received character is checked and, if not sync, is considered an invalid character.

Exiting Test mode can be done in the middle of receiving a quartet. Entering is done only at the end of a quartet. This allows the old drop to exit before the new drop enters.

Inbound Responses In Short Form Mode and Status Monitor Operation

In learn mode, outbound data is translated by the IP to the NCS command which tests for terminal power. The purpose of this is to determine hot spare locations. If an inbound carrier is received, the IP replies to the SP with a packet. The packet comprises the "NAK" character if the received data is a space and comprises the "ACK" character if the received data is a mark. The "ACK" character is eight 1's (plus start and stop bits). The "NAK" character is eight 0's. The Hot Spare and DTE power bits in the status table are set to fail if the response in learn mode is a space, as this indicates the inactive one of a hot spare pair. When a learn mode message is addressed to the IP itself, the response is always ACK since hot sparing is not offered for the IP.

In AM mode, outbound data is translated to one or more of the status monitor commands. If an inbound carrier is received, the IP replies to the SP with either the ACK or NAK packet, depending on the polarity of the received inbound data and the polarity of data stored in the IP's status table. The IP stores in the status table the status vector for the 400 possible address locations in its network port (i.e., 10 lines each having 40 drops). The status vector for each location contains the status of 8 status variables. One or more of the status variables for a given address is measured and bit status in the table is updated when changes of state are detected. This includes the IP's own address and remote addresses. The outbound message is translated to one or more of seven commands and elicits a response from the address location showing the status of one or more of the 8 variables. A mark response from an RTM indicates the normal or pass state of the variable; space indicates abnormal or fail.

The reply from the IP to the SP in AM mode is computed from three items: (1) previously stored status of the variable being checked; (2) the response showing current status; (3) wehther the poll is the first or second one. On the first poll, the response is ACK (indicating no change of state) when the previous and current status match and NAK (indicating change of state) when they differ.

When the response to the first poll is NAK, the SP repeats the same AM request one more time to confirm the result. On the second poll, the response is NAK if the results of both polls confirm that a variable's status has changed.

Status variables include the following: Streaming Terminal or Streaming Carrier; Data Set In Test Mode (DSR); Streaming Terminal Disabled; Outbound Received Signal Quality (SQD); Outbound Received Data Signal Level; External Alarm; DTE power; and Hot Spare.

The Streaming Terminal and/or Streaming Carrier variables are used to detect a condition referred to as "streaming." Streaming Terminal occurs when, for various reasons, a remote site unit asserts a signal on the CA lead and then fails to terminate the signal. Normally the CA signal persists only until the end of the transmission from the site that is asserting the signal. As long as a drop asserts the CA signal, it causes its modem to tie up the line connected thereto. If it fails to terminate the signal, it will tie up the line indefinitely. Accordingly, a timer is activated each time the CA signal is asserted. If the CA signal remains active for longer than a predetermined period of time (e.g., about 13 seconds in the illustrated embodiment), a malfunction is indicated. This malfunction effectively precludes any other transmission over the affected line. The Streaming Terminal and Streaming Carrier variable are alternate parts of the same problem. The Streaming Terminal variable relates to the location other than an IP, while the Streaming Carrier variable relates to the IP location. Thus, the corresponding condition at the IP is a fail status for the CF lead, indicating that it has been high continuously over 13 seconds of the time of sampling.

The Streaming Terminal Disabled status variable simply indicates whether a terminal has been disabled due to the detection of a streaming condition. Streaming Terminal may be disabled automatically by the RTM or upon a manual command from the operator.

DSR and SQD status variables are available on the modem terminal interface and thus can be conveniently monitored. The Outbound Received Data Signal Level simply provides a pass/fail indication of whether that signal is within a specified range of a nominal value. The External Alarm variable is provided for user control and its status is not generated by the system per se, although it is monitored by the system.

The DTE Power status variable provides a simple indication of whether a terminal connected to the host modem of an RTM is turned on or off, by monitoring a terminal interface lead to determine whether it is being powered.

The Hot Spare status variable indicates whether the host modem at a remote site is provided with a stand-by "Hot Spare" partner which serves as a back-up unit which could be substituted for the host modem if it is not operating properly. As not all drops are so equipped, it is necessary to differentiate between those that have Hot Spare partners and those that do not. For this purpose, each RTM may be provided with a "flag" which may be manually set upon installation to indicate whether it is one of a Hot Spare pair. The condition of this flag will be detected during AM mode. Then, to determine which one of the Hot Spares is active and which is the actual stand-by "Hot Spare", DTE Power may be checked on the paired RTM's.

As a more complicated alternative if the RTM's are not provided with the Hot Spare flag, information regarding the addresses of RTM's having Hot Spare partners must be stored somewhere in the system, such as in the SP. This information is based upon the assumption that any drop failing DTE power during learn mode is the inactive partner of a Hot Spare pair.

If an RTM fails DTE Power or another status variable and it is a member of a Hot Spare pair, its Hot Spare partner may be substituted, either manually or automatically. If the Hot Spare partner also fails DTE Power, etc. then the drop fails completely.

For simplicity, it may be desirable to provide the members of a Hot Spare pair with adjacent addresses and to adopt an addressing convention such as to give the first member of the pair an even address and the second member of the pair the next consecutive (greater) odd address. Thus, if one is addressing the former member of the pair, it is known that the other member of the pair will be addressed by incrementing the address by one.

When the RTM's do not have a Hot Spare flag, a Hot Spare bit for a given address can be reset or set by issuing the command Reset Hot Spare status or Set Hot Spare status for that address. These commands are used when the assumptions Mode During Learn mode are found to be incorrect.

Status Variable Selection in AM Mode

Since the IP can check the status of only one variable at a time, it must select one variable each time it interrogates a given address. Selection is made using an internal counter. The counter is incremented when the IP's own address is selected in AM mode, for a first poll. Thus, the IP selects the same variable for all addresses during any given pass through the network. This works because the SP will scan the entire network before returning to any drop, except when a change of state is reported. As particularly implemented in the illustrated embodiment, not all variables are checked with the same frequency. The checking of each variable, though, is distributed evenly in time.

It should also be noted that, as another possible implementation, the IP can check the status of all variables in a single poll. This would be done by using a transmission format similar to the Status Snapshot command format.

If either alternative is used, it is possible to mask changes of state in individual status variables at selected times, so that anticipated changes in status variables which are consistent with proper system operation do not trigger a reaction and updating of the status table if that were not desirable.

After a change of state, the status is checked in the TMADT mode. This requires only that the IP be in Test mode. During the poll, the IP examines the status variables of the remote test modules and stores that information in a status table. The status table information is relayed back to the CP at an initial point in time. In subsequent status checking, the IP notes only when there has been a change of state. It updates its status table in response to a change in state and in a subsequent status request indicates its most recent status reading to the CP. The CP can then do a comparison with the prior status reading which it has stored, to determine what has changed.

When the Status Table is "Reset," all entries of faults are deleted. This is done when the IP's power is turned on and when it receives a message in Learn mode for its own address. The status vector for a single given address can be reset by issuing the command Reset Status Vector for that address.

What is claimed as new and desired to be secured by Letters Patent of the United States is:

1. In a network testing and control system for use with a digital communications network which provides digital communication between a plurality of sites, one of said sites being designated a central site and the other sites being designated remote sites and said digital communications between said central site and said remote sites being over a plurality of analog communications links, each remote site having means for generating a unique site address identifying said site, and wherein said remote sites can dynamically connect to and disconnect from said network, an improvement for reporting on the operational status of remote sites connected to said communication network communications links, said improvement comprising, at the central site means for polling the remote sites connected to said communications links with an address inquiry signal to determine their addresses;

means for storing at the central site a record of the addresses determined by remote site responses to such polling, to provide a site location table containing the addresses of the remote sites;

means for updating said site location table as remote sites connect to and disconnect from said communications links;

means for transmitting, over said communications links in a shared and selectively concurrent arrangement with said digital communications network, a status request signal to each remote site address contained in the site location table, in response to a command, to evoke a status signal from each remote site indicative of the status of at least one selected variable associated with that remote site, said variable comprising a status condition, signal or operating parameter at the remote site; and means for receiving remote site status signals transmitted from remote sites over said communication links in a shared and selectively concurrent arrangement with said digital communications network.

2. The improved network testing and control system of claim 1 wherein the means for transmitting further includes means for repeating automatically the transmission of status request signals to the remote sites at predefined intervals.

3. The network testing and control system of claim 1 or claim 2 wherein said remote sites include means for generating status signals, and further including, at the central site, means for detecting a change of status in a remote site variable and means for displaying an indication of such change of status.

4. The network testing and control system of claim 1 or claim 2 further including, at the central site,
means for storing permissible values for remote site variables,
means for accepting and storing permissible values for selected monitored remote site variables,
means for detecting variable deviation from its permissible values, and
means for signalling to a system operator when a selected monitored remote site variable deviates from its permissible value.

5. The network testing and control system of claim 4 further including at the central site means for generating and storing information pertaining to each remote site variable which deviates from its permissible value.

6. For use with a digital communications network which provides digital communication between a plurality of sites, one of said sites being designated a central site and the other sites being designated remote sites and said digital communications between said central site and said remote sites being over a plurality of analog communications links, each site being uniquely identified by a site address selected from a pool of available site addresses, an improved network testing and control system comprising, at the central site;
means for selectively and concurrently sharing said communication links with a host processor at said central site for reporting on the operational status of remote sites connected to said communication network communications links, said sharing and reporting means having
means for testing operating equipment at a remote site including means for transmitting a test signal sequence to the remote site, and for receiving a test signal response from the remote site, via the shared communications link associated with the remote site address;
means for accepting at the central site test-scheduling information including a dynamically changeable designation of a test sequence to be performed at a later time, the address of the remote site on which the test sequence is to be performed, and the time when the test sequence is to begin;
means for storing the test-scheduling information; and
means for providing the test-scheduling information to the test signal sequence transmitting means at the designated date and time, for automatically initiating the scheduled test sequence at the designated remote site.

7. The network testing and control system of claim 6 wherein the means for testing a remote site includes means for receiving a response to a test signal sequence and further including means for recording such response.

8. The network testing and control system of claim 7 wherein the means for recording includes means for providing a visual indication of the response.

9. The network testing and control system of claim 8 wherein the visual indication is in the form of a printed copy.

10. A method of monitoring the operative status of remote site equipment in a digital communications network from a central site of the network, wherein said network has plural remote sites each of which is operable asynchronously of other remote sites and of said central site, the network having analog communication links connecting said central site to said remote site equipment, said central site having a host data processing system, said method including the monitoring of a plurality of status variables for each remote site and comprising, for each remote site, the steps of
sharing said communication links between said host system and a central-site monitoring system;
generating, in response to selectively concurrently shared two-way signal communication between said central site and said remote site on said communication links, an initial status listing responsive to the status variables for the remote site;
generating a status change signal responsive to a change of at least one status variable from its value in the status listing; and
responsive to the status change signal, determining for the associated variable, the state change or changes.

11. The method of claim 10 wherein a status variable may be in one of two available states and the change signal is generated in response to a status variable changing from one of said states to the other of said states.

12. The method of claim 11 further including the step of verifying that at least one variable has changed state upon the generation of the status change signal.

13. A method of monitoring the operative status of remote site equipment in a digital communications network from a central site of the network, wherein said network has plural remote sites each of which is operable asynchronously of other remote sites and of said central site, the network having analog communications links connecting the central site to the remote site equipment, and over which a host processor at the central site communicates with the remote sites, and wherein the central site further includes first and second data processing systems, the first data processing system being connected directly to the second data processing system and the second data processing system being further connected to the remote sites over said links, said method comprising, for each remote site to be monitored, the steps of
selectively concurrently sharing communication of status signals between said central-site data processing systems and said remote sites over said analog communications links with the digital communication of said network;

generating, in response to said communication of status signals, a status listing containing the initial status of the status variables to be monitored;

the first data processing system sending to the second data processing system a status change inquiry signal;

responsive to the status change inquiry signal, the second data processing system sending a status change signal to the first data processing system if any of the monitored status variables have changed state since the generation of the status listing, and the second data processing system sending a no status change signal if none of the monitored status variables has changed state since the generation of the status listing;

responsive to receiving a status change signal, the first data processing system sending to the second data processing system another, second status change inquiry signal;

responsive to the second status change inquiry signal, the second data processing system sending a second status change signal to the first data processing system if any of the monitored status variables have changed state since the generation of the status listing and sending a said no status change signal if none of the monitored status variables has changed state since the generation of the status listing;

responsive to receiving a second status change signal, the first data processing system sending to the second data processing system a first status request signal; and responsive to the first status request signal, the second data processing system sending to the first data processing system a status update signal indicating the status of each of the monitored status variables.

14. The method of claim 13 further including the step of updating the status listing to indicate correctly the status of each of the monitored status variables, according to the status update signal, and wherein the steps commencing with the step of the first data processing system sending to the second data processing system a status change inquiry signal are repeated at predefined intervals and after each repetition of such steps the status listing is updated to indicate correctly the status of each of the monitored status variables, according to the status update signal.

15. For use with a digital communications network which provides digital communication between a plurality of sites, one of said sites being designated a central site and the other sites being designated remote sites and said digital communications between said central site and said remote sites being over a plurality of analog communications links, said central site having a host processing system communicating with said remote sites over said communications links, an improved network testing and control system comprising, at the central site, means for selectively concurrently sharing said communications links with said host processing systems for reporting on the operational status of remote sites connected to said communication network communications links, said sharing and reporting means having a data processing system including a plurality of connection port means, each port means being connected to at least one communications link of the network for providing serial communications between the data processing system and each remote site on such link, said data processing system and said host processing system selectively concurrently sharing said communications links;

the data processing system further comprising means for communicating substantially simultaneously, in parallel, through each port means over said communications links with the remote sites connected thereto and means, with respect to each port, responsive to a preselected signal, for monitoring, over said communications links, the remote sites connected thereto, and for ascertaining from data received over said shared links the status of at least one selected variable associated with each remote site, said variable comprising a status condition, signal or operating parameter.

16. Apparatus for monitoring the operative status of remote site equipment in a digital communications network from a central site of the network, wherein said network has plural remote sites each of which is operable asynchronously of other remote sites and of said central site, said network providing digital communications between said central site and said remote sites over a plurality of analog communication links, said central site having a host processing system communicating with said remote sites over said communication links, said monitoring apparatus comprising memory means for storing status information, means for generating and storing in said memory means, in response to status inquiry signals, information corresponding to the initial status of the status variables for each monitored remote site, means for generating a status change signal responsive to a change of state of at least one status variable of a monitored remote site, means at the remote site responsive to the status change signal for determining the variable state change or changes in response to which said status change signal was generated, said means for determining comprising means for comparing the states of status variables to the initial status information stored in the memory means, and means for selectively concurrently sharing the communication of said status inquiry signals and said status variable signals and said status change signals between said central and said remote sites over said communications links with said digital communication.

17. For use with a digital communications network which provides digital communication between a plurality of sites, one of said sites being designated a central site and the other sites being designated remote sites and said digital communications between said central site and said remote sites being over a plurality of analog communications links, each site being uniquely identified by a site address selected from a pool of available site addresses, said central site having a host computer communicating over said communication links, an improved network testing and control system comprising, at the central site, means for selectively concurrently sharing said communications links with said host processing systems for reporting on the operational status of remote sites connected to said communication network communications links, a plurality of connection port means, each port means being connected to at least one communications link of the network for providing serial communications between the central site and each remote site on such link with said sharing;

means at the central site for accepting test-scheduling information including a dynamically changeable designation of a test to be performed at a later time, the port means for which a remote site test is to be performed, and the time of day when the test is to begin;

means for storing the test-scheduling information; and means for initiating automatically the scheduled test, on the remote sites connected to the designated port means, at the designated time and on said links with said sharing.

18. For use with a digital communications network which provides digital communication between a plurality of sites, one of said sites being designated a central site and the other sites being designated remote sites and said digital communications between said central site and said remote sites being over a plurality of analog communications links, each site having means for generating a unique site address identifying said site, and wherein said remote site can dynamically connect and disconnect from said network, an improved network testing and control system, comprising, at the central site, means for selectively concurrently sharing said communications links with a host processor at said central site for reporting on the operational status of remote sites connected to said communication network communications links, means for polling the remote sites connected to said shared lines to determine their addresses, means for storing a record of the addresses determined by such polling, to provide a site location table containing the addresses of the remote site, and means for updating said site location table.

19. The improved network testing and control system of claim 18 further comprising means responsive to the site location table for organizing the remote site addresses according to at least its port and line connections for associating with each stored remote site address, its port and line connection for directing communications to said site.

20. The improved network testing and control system of claim 18 wherein said polling means further comprises means for determining which of the responding remote sites is a hot spare.

21. A method for monitoring the operative status of remote site equipment in a digital communications network from a central site of the network, wherein said network has plural remote sites each of which is operable asynchronously of other remote sites and of said central site, the network having analog communications links connecting said remote sites to said central site and over which a host processor at the central site communicates with the remote sites, said method including monitoring a plurality of status variables for each remote site for reporting on the operational status of remote sites connected to said communication network communications links, and comprising the steps of selectively concurrently sharing communication of such status between the central site and the remote sites over the analog communications links used by said host processor with said digital communications of said network, generating at and transmitting from the central site, and receiving at at least one remote site, over said analog communications links, time mask data, monitoring and processing at said central site status variable changes at least at said one remote site and received over said analog communications links, and inhibiting, at the central site, the processing of status variable changes received over said analog communications links from at least said one remote site during time periods determined by said time mask data.

22. The network testing and control system of claim 21 further comprising the step of selectively disabling and enabling the transmission of status request signals to selected ones of said remote sites.

* * * * *